(12) United States Patent
Onogi et al.

(10) Patent No.: US 12,481,489 B2
(45) Date of Patent: Nov. 25, 2025

(54) PROGRAM UPDATE SYSTEM AND INFORMATION PROCESSING APPARATUS

(71) Applicant: SHARP KABUSHIKI KAISHA, Sakai (JP)

(72) Inventors: Kenji Onogi, Sakai (JP); Masato Shiozaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 292 days.

(21) Appl. No.: 18/127,526

(22) Filed: Mar. 28, 2023

(65) Prior Publication Data

US 2023/0315427 A1 Oct. 5, 2023

(30) Foreign Application Priority Data

Mar. 30, 2022 (JP) ................................ 2022-056568

(51) Int. Cl.
  *G06F 8/65* (2018.01)
  *G06F 9/48* (2006.01)
(52) U.S. Cl.
  CPC .............. *G06F 8/65* (2013.01); *G06F 9/4887* (2013.01)
(58) Field of Classification Search
  USPC ........................................................ 717/172
  See application file for complete search history.

(56) References Cited

U.S. PATENT DOCUMENTS

2003/0035139 A1 2/2003 Tomita et al.
2004/0215706 A1* 10/2004 Lavender .............. G06F 3/1211
  709/201
(Continued)

FOREIGN PATENT DOCUMENTS

JP 2003-058338 A 2/2003
JP 2004-064715 A 2/2004
(Continued)

OTHER PUBLICATIONS

"Software Updates"; Tesla Model 3 Owner's Manual found at the Tesla.com website [full URL included in ref.] as captured by the Wayback Machine Internet Archive (archive.org) on Feb. 10, 2022 (Year: 2022).*

*Primary Examiner* — Yuqing Xiao
*Assistant Examiner* — Clint Thatcher
(74) *Attorney, Agent, or Firm* — ScienBiziP, P.C.

(57) ABSTRACT

Plural information processing apparatuses include at least one primary machine and at least one secondary machine. The primary machine includes: a job data management storage that manages and stores acquired job data; an update data acquirer that acquires update data used to update a control program controlling operation of the information processing apparatus; an update data storage that stores the acquired update data; and an update data distributor that distributes the update data retrieved from the update data storage to the secondary machine. The secondary machine includes a program update executor that stores a control program controlling own operation and updates the control program by using received update data. At least one of timing at which the primary machine distributes the update data and timing at which the secondary machine updates the control program is determined according to the job data.

14 Claims, 16 Drawing Sheets

(56) References Cited

U.S. PATENT DOCUMENTS

| | | | | |
|---|---|---|---|---|
| 2006/0010449 A1* | 1/2006 | Flower | ............... | G06F 9/5044 |
| | | | | 718/102 |
| 2009/0213418 A1* | 8/2009 | Kaneko | ............. | H04N 1/00344 |
| | | | | 358/1.15 |
| 2014/0068597 A1* | 3/2014 | Hirahara | ............... | G06F 8/654 |
| | | | | 717/173 |
| 2015/0379289 A1* | 12/2015 | Akiyama | ............... | G06F 8/61 |
| | | | | 726/28 |
| 2016/0261773 A1 | 9/2016 | Tsuji | | |
| 2021/0149726 A1* | 5/2021 | Arai | ............... | G06F 9/4881 |
| 2022/0214910 A1* | 7/2022 | Honda | ............. | G06Q 10/06316 |

FOREIGN PATENT DOCUMENTS

| | | |
|---|---|---|
| JP | 2006-221224 A | 8/2006 |
| JP | 2016-159540 A | 9/2016 |

* cited by examiner

FIG. 5

| JOB ACQUISITION TIME tj | 44 |
|---|---|
| 2021.09.25,11:00 | |

| DELAY SET PERIOD t0 | 45 |
|---|---|
| 20 MINUTES | |

| CHANGED UPDATE TIME t2 | 46 |
|---|---|
| 2021.09.25,11:20 | |

( t2 = tj + t0 )

| SCHEDULED DISTRIBUTION TIME th | 47 |
|---|---|
| 2021.09.25,11:20 | |

( th = tj + t0 )

| ACQUIRED RESPONSE INFORMATION | 48 | |
|---|---|---|
| 01 | NO UPDATE PROGRAM | |
| 02 | RETRY RESPONSE (STANDBY FOR UPDATE) | |
| 03 | UPDATABLE RESPONSE | |

FIG. 6

| SET UPDATE EXECUTION TIME S | 74 |
|---|---|
| 03:00 | |

| UPDATE ACQUISITION TIME tk | 75 |
|---|---|
| 2021.09.24,16:00 | |

| UPDATE START CALCULATION INFORMATION t1 | 76 |
|---|---|
| 2021.09.25,03:00 | |

| CHANGED UPDATE TIME t2 | 77 |
|---|---|
| 2021.09.25,11:00 | |

| SCHEDULED UPDATE START TIME T | 78 |
|---|---|
| 2021.09.25,03:00 | |

| RESTART INTERVAL INFORMATION tR | 79 |
|---|---|
| 30 MINUTES | |

PROGRAM UPDATE SYSTEM AND INFORMATION PROCESSING APPARATUS

BACKGROUND OF THE INVENTION

Field of the Invention

The present disclosure relates to a program update system and, in particular, to a program update system that distributes a control program for controlling operation of an information processing apparatus such as an image forming apparatus to the information processing apparatus and that updates the control program of the information processing apparatus with a new control program.

Description of the Background Art

Conventionally, image forming apparatuses having a large number of functions, such as a printing function, a document reading function, a function to transmit read image data, an image data acquisition function, and a character recognition function, have been used. Each of the printing systems acquires a print job, which includes the image data or the like held by the information processing apparatus as a server, via a network by operating the image forming apparatus, so as to print the image data or the like. Among the printing systems as described above, there is the printing system in which the image forming apparatus plays a role as the server. In other words, the image forming apparatus (a primary machine), which serves as the server, receives and holds the print job including the image data or the like, transmits the designated print job to another image forming apparatus (a secondary machine) in response to a request from the secondary machine via the network, and causes the secondary machine to print the print job.

Such an image forming apparatus stores a control program for implementing the large number of the functions.

This control program may be updated with a new program in order to add or change a function, correct a defect, or the like.

The control program may be updated per image forming apparatus by maintenance personnel who visits an installed location of the image forming apparatus.

In addition, the following system has also been used. In the case where a large number of the image forming apparatuses are maintained, the new control program is saved in a predetermined server, the new control program is distributed from this server to each of the large number of the image forming apparatuses via the network, and, in each of the image forming apparatuses, the control program is automatically replaced with the newly received control program.

Furthermore, for example, the following automatic update system has been known. In the automatic update system, a content server, a file information provision server, a mail server, and an automatic update device are connected via a communicator such as the Internet. The content server stores an update program, the file information provision server provides file information of the update program, the mail server receives an e-mail that includes the file information transmitted from the file information provision server, and the automatic update device writes the downloaded update program to update software. Then, when confirming that there is the e-mail in a mailbox of the mail server, the automatic update device receives the e-mail from the mail server, accesses the content server according to the file information that is included in the received e-mail, downloads the update program from the content server, and writes the downloaded update program in a ROM area, so as to update the software.

It has also been known that, in the case where update time is specified, the above-described automatic update device, which has downloaded the update program, updates the software with the downloaded update program at the specified update time.

However, in general, when the control program is updated in the image forming apparatus or the like, it is impossible to implement the original printing function or the like of the image forming apparatus and to perform an input operation therefor.

For example, in the case where the update of the control program is started at the time when a user who intends to use the imaging forming apparatus is about to perform the input operation to acquire the print job from the server for printing, the user may not be able to perform the normal input operation and have to wait for a long time until the update of the control program update is completed.

It is considered to avoid a problem as described above by setting update start time such that the control program is updated in a time of day with a low frequency of use by the user. In the case where the image forming apparatus is operated to be always turned off in such a time of day, a situation possibly arises where the control program is not updated as expected by the maintenance personnel.

The present disclosure has been made in consideration of a circumstance as described above, and therefore has a purpose of ensuring convenience of a user by inhibiting update of a control program in a period in which a job is highly likely to be executed by an input operation, so as to reduce possible occurrence of a situation where, due to initiation of the update of the control program, the user cannot perform the normal input operation at the time of intending to use an information processing apparatus such as an image forming apparatus and has to wait until completion of the update.

SUMMARY OF THE INVENTION

The present disclosure provides a program update system constructed of plural information processing apparatuses that are connected via a network. The plural information processing apparatuses include at least one primary machine and at least one secondary machine. The information processing apparatus as the primary machine includes: a job data acquirer that acquires job data including data to be processed in the information processing apparatus as the secondary machine; a job data management storage that manages and stores the acquired job data; a job data transmitter that transmits the job data to the secondary machine via the network, the job data being retrieved from the job data management storage according to a request from the secondary machine; an update data acquirer that acquires update data for updating a control program that controls operation of the information processing apparatus; an update data storage that stores the acquired update data; and an update data distributor that distributes the update data retrieved from the update data storage to the secondary machine via the network. The information processing apparatus as the secondary machine includes: a job data requestor that requests transmission of the job data from the primary machine via the network; a job data receiver that receives the job data transmitted from the primary machine; a job executor that implements a function provided to the information processing apparatus by processing the received job data; a program storage that stores a control program controlling own operation; an update data receiver that receives the update data from the primary machine via the network; and a program update executor that updates the control program stored in the program storage, by using the received update data. At least one of timing at which the primary machine distributes the update data and timing at which the secondary machine updates the control program is determined according to the job data that is stored in the job data management storage.

The primary machine includes a second job executor that implements the function provided to the information processing apparatus in a similar manner to the secondary machine by processing the job data that is retrieved from the job data management storage.

The primary machine further includes: a scheduled distribution time determination device that determines scheduled distribution time of the update data on the basis of time at which the job data is acquired in response to that the job data is acquired and stored in the job data management storage; and a storage that stores the scheduled distribution time. The update data distributor distributes the update data at timing that is based on the scheduled distribution time.

The primary machine further includes a setting storage that stores a setting of a delay period that is a setting to provide a period in which the update data is not transmitted after the job data is received. The scheduled distribution time determination device determines the scheduled distribution time by using time at which the job data stored in the job data management storage is acquired last and the setting of the delay period stored in advance.

In the primary machine, in the case where the job data acquirer acquires new job data after the scheduled distribution time is stored in the storage, the scheduled distribution time determination device changes the scheduled distribution time on the basis of time at which the new job data is acquired.

In the primary machine, in the case where the job data acquirer acquires at least one piece of the job data, job acquisition time as the time at which each piece of the job data is acquired is stored in the job data management storage in association with the job data. In the case where, after the storage stores the scheduled distribution time, the job data, which is retrieved from the job data management storage in response to the request from the secondary machine, is transmitted to the secondary machine via the network by the job data transmitter, the scheduled distribution time determination device changes the scheduled distribution time by using the job acquisition time of the job data that is other than the above job data and is stored in the job data management storage.

The secondary machine includes: an update data storage that stores the received update data; a scheduled update start time setting device that sets scheduled update start time on the basis of the time at which the update data is received, the scheduled update start time being time at which the control program starts updated; and a storage that stores the scheduled update start time. The primary machine changes the scheduled update start time in response to storing of new job data in the job data management storage, and the program update executor updates the control program at timing that is based on the scheduled update start time.

The secondary machine further includes a setting storage that stores an update start time setting, the update start time setting being a setting related to time at which the control program of the secondary machine starts updated. The scheduled update start time setting device uses the update start time setting, which is stored in advance, when setting the scheduled update start time.

The primary machine further includes an update control information transmitter that transmits update control information to the secondary machine in the case where the job data acquirer acquires a job and the job data is transmitted to the secondary machine via the network, the update control information being information used to determine scheduled time at which the secondary machine executes control program update processing. In the case where the job acquirer acquires a new job, the update control information transmitter transmits the update control information to the secondary machine, and the scheduled update start time setting device of the secondary machine updates the scheduled update start time on the basis of the received update control information.

The primary machine further includes: an update acquisition request receiver that receives an update data acquisition request transmitted from the secondary machine; and a distribution propriety determination device that determines whether to distribute the update data by the update data distributor according to the job data stored in the job data management storage in the case where the update data acquisition request is received from the secondary machine. The secondary machine further includes an update data acquisition requestor that transmits the update data acquisition request to the primary machine, the update data acquisition request being a request to acquire the update data.

The secondary machine further includes a setting storage that stores an update request time setting, the update request time setting being a setting related to time at which the update data acquisition request is transmitted to the primary machine. The update data acquisition requestor transmits the update data acquisition request at timing that is based on the update request time setting.

In a program update system according to the present disclosure, the information processing apparatus is an image forming apparatus.

The present disclosure provides an information processing apparatus that includes: a job data acquirer that acquires job data including data to be processed in the information processing apparatus as the secondary machine; a job data management storage that manages and stores the acquired job data; a job data transmitter that transmits the job data to a second information processing apparatus via a network, the job data being retrieved from the job data management storage according to a request from the second information processing apparatus; an update data acquirer that acquires update data for updating a control program that controls operation of the information processing apparatus; an update data storage that stores the acquired update data; and an update data distributor that distributes the update data retrieved from the update data storage to the second information processing apparatus via the network. Timing to distribute or whether to distribute the update data is determined according to the job data that is stored in the job data management storage.

The present disclosure provides a method for updating a program of an information processing apparatus that updates a control program with which a predetermined function is implemented by update data, the information processing apparatus including: a primary machine that receives the update data transmitted from a distributor; and one or plural secondary machines, each of which updates a control program by using the update data transmitted from the primary machine, the control program implementing a function of an own information processing apparatus. The method for updating a program of an information processing apparatus includes causing a controller provided to the primary machine to: store scheduled distribution time that is scheduled time at which the update data is distributed to the secondary machine; acquire update data used to update the control program; acquire a job including data to be processed in the information processing apparatus; set and store job acquisition time that is time at which the job is acquired; and distribute the acquired update data to the secondary machine after the scheduled distribution time passes. The method for updating a program of an information processing apparatus also includes thereafter causing a controller provided to the secondary machine to: receive the update data that is distributed from the primary machine; and update the control program by using the received update data. In the case where one or a plurality of the jobs is acquired by the job acquisition, the job acquisition time is set and stored for each of the acquired jobs. Tor the distribution of the update data, the scheduled distribution time is set by using the job acquisition time of a last acquired job among plural values of the set and stored job acquisition time, and the update data is distributed to the secondary machine when current time has passed the set scheduled distribution time.

According to the present disclosure, in the case where the job acquirer of the primary machine as the information processing apparatus acquires the one or plural jobs, the job acquisition time is set and stored for each of the acquired jobs. The scheduled distribution time is set by using the job acquisition time of the last acquired job among the plural values of the set and stored job acquisition time, and the update data is distributed to the secondary machine when the current time has passed the set scheduled distribution time. Therefore, it is possible to avoid such a situation where, since the control program starts updated in the secondary machine as the information processing apparatus, the function that a user attempts to implement cannot be implemented. In addition, it is possible to secure convenience of the user who uses the information processing apparatus by avoiding an overlap between execution of the job by the user and timing for updating the control program.

BRIEF DESCRIPTION OF THE DRAWINGS

FIG. 5 includes explanatory views of examples of information stored in a storage of the image forming apparatus (the primary machine) according to the present disclosure.

FIG. 6 includes explanatory views of examples of information stored in a storage of the image forming apparatus (the secondary machine) according to the present disclosure.

DESCRIPTION OF THE PREFERRED EMBODIMENTS

A description will hereinafter be made on embodiments of the present disclosure with reference to the drawings. The description of the embodiments below does not limit the present disclosure.

Configuration of Program Update System

Figure 1:
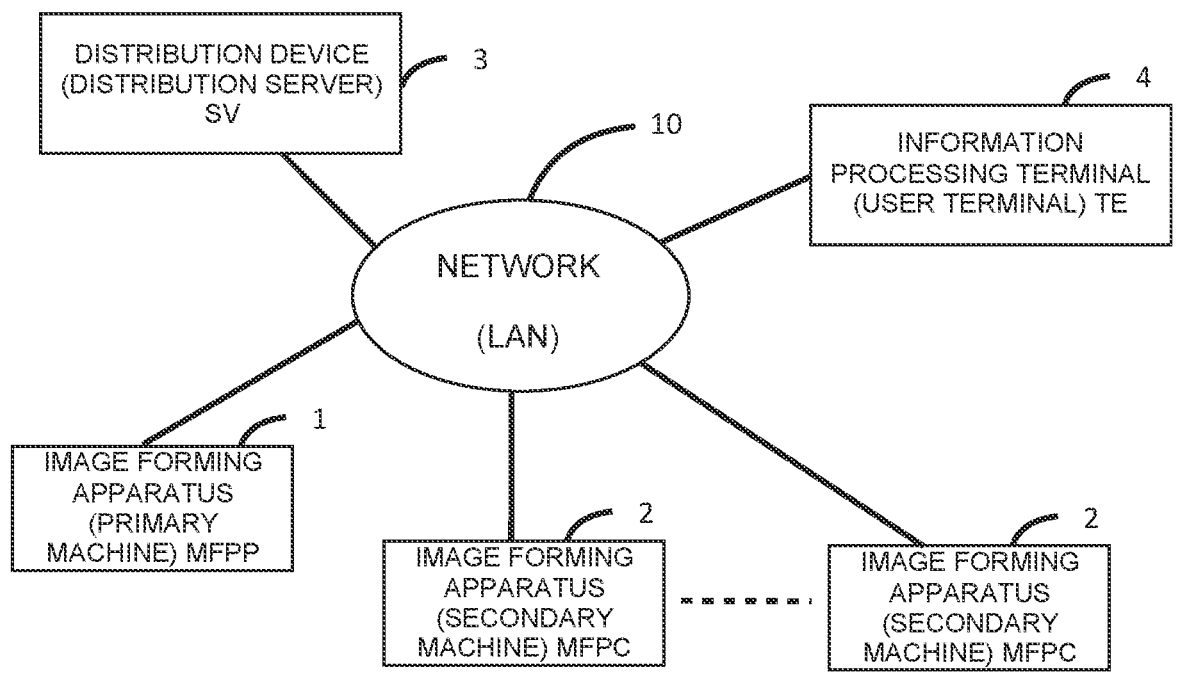
FIG. 1 is a schematic explanatory view of an example of a program update system according to the present disclosure.

FIG. 1 is a schematic explanatory view of an example of a program update system according to the present disclosure.

In FIG. 1, the program update system according to the present disclosure mainly includes: a distribution device 3 that is connected via a network 10; and image forming apparatuses (1, 2), each of which processes image data.

The single image forming apparatus may be provided, or the plural image forming apparatuses may be connected to the network.

The image forming apparatuses (1, 2) each correspond to the information processing apparatus according to the present disclosure.

In addition, an information processing terminal 4 that is owned by a user may be included in the program update system. The information processing terminal 4 is an information processing terminal on which the user creates and inputs print data and which transmits the print data to the image forming apparatus.

In the following embodiment, a description will be made on update processing of a control program that is installed in the image forming apparatus corresponding to the information processing apparatus.

However, the control program update processing according to the present disclosure can also be applied to update processing of a control program that is installed not only in the image forming apparatus but also in the information processing apparatus (for example, a personal computer, a mobile terminal, or the like) other than the image forming apparatus. Information that includes data to be processed in the information processing apparatus will be referred to as a job. In the following embodiment, among the jobs, each of which includes the data to be processed in the image forming apparatus, the job whose primary purpose is printing will be referred to as a print job.

The distribution device 3, each of the image forming apparatuses (1, 2), and the information processing terminal 4 are mutually communicable via the network 10. The number of each of the image forming apparatus and the information processing terminal connected to the distribution device 3 via the network 10 is not limited to one and may be plural.

Any of existing communication networks including a wide area network such as the internet, a LAN, and the like can be used as the network 10, and any of both wired and wireless communication methods may be used.

The image forming apparatus (a multifunction peripheral: MFP) is an apparatus that processes the image data, and inputs, creates, outputs, saves, transfers the image data, and the like.

The image forming apparatus will also be referred to as the multifunction peripheral or will simply be referred to as the MFP.

In the present disclosure, the image forming apparatus, which corresponds to the information processing apparatus, includes: a primary machine 1 that receives update data transmitted from the distribution device 3; and one or plural secondary machines 2, each of which updates the control program by using the update data distributed from the primary machine. The control program implements functions of the own image forming apparatus.

Hereinafter, the primary machine 1 will also be referred to as an FPP, and the secondary machine 2 will also be referred to as an MFPC.

The distribution device 3 is a device that mainly stores the control program used by the image forming apparatus MFP and distributes the control program to the image forming apparatus MFP.

In the case where a defect of the control program is corrected, a new function is added to the control program, or the like, the control program is updated.

Data that includes an update program for updating this control program used in the image forming apparatus MFP will be referred to as update data.

In the case where it is necessary to update the control program that has already been stored in the image forming apparatus MFP, the update data for updating the control program is stored in the distribution device 3 and is transmitted from the distribution device 3 to the image forming apparatus MFP as the primary machine.

In the following embodiment, the update data is transmitted from the distribution device 3 to the image forming apparatus MFP as the primary machine. However, the update data may be saved in an external storage medium such as USB flash drive, and the update data may be acquired from the external storage medium by directly attaching the external storage medium to the primary machine.

The distribution device 3 will also be referred to as a distribution server or will also simply be referred to as an SV.

The update data may directly be transmitted from the distribution device 3 to each of the image forming apparatuses. However, in the present disclosure, the update data is transmitted only to the primary machine 1 of the plural image forming apparatuses.

The control program is a program for implementing the functions provided to the image forming apparatus, is software that is installed in each of the image forming apparatuses, and will also be referred to as control software.

The update data is data for adding a new function to the image forming apparatus or changing and improving the function thereof by updating the control program. The control program is updated through predetermined processing by the control program.

As described above, the information processing terminal 4 is a device owned by the user who intends to use the image forming apparatus, and corresponds to the personal computer or the mobile terminal.

The information processing terminal 4 will also be referred to as a user terminal or will also simply be referred to as a TE.

Configuration of Image Forming Apparatus

The image forming apparatus MFP is an electronic apparatus that has a function to process the image data. Examples of such functions are a reproduction (copy) function, a printing function, a document reading (scanning) function, a document editing function, a document saving function, a document transmission (facsimile) function, and a communication function. As described above, the image forming apparatus MFP includes: the primary machine MFPP that directly receives the control program from the distribution server SV; and the secondary machine MFPC that receives the control program from the primary machine MFPP. The processing related to a control program update function differs between the primary machine MFPP and the secondary machine MFPC. Thus, configuration block diagrams of the primary machine MFPP and the secondary machine MFPC will separately be described. The primary machine MFPP is a machine that has a function to receive the update data and the print job and distribute the update data and the print job to the secondary machine MFPC. However, the primary machine MFPP does not have to be the image forming apparatus having the printing function and the like, and may be the information processing apparatus that does not have the printing function and the like.

In addition, in the embodiment below, a description will be made on the image forming apparatus MFP according to the present disclosure that particularly has the printing function. However, the image forming apparatus MFP may have a function other than the above function.

Configuration of Image Forming Apparatus (Primary Machine)

Figure 2:
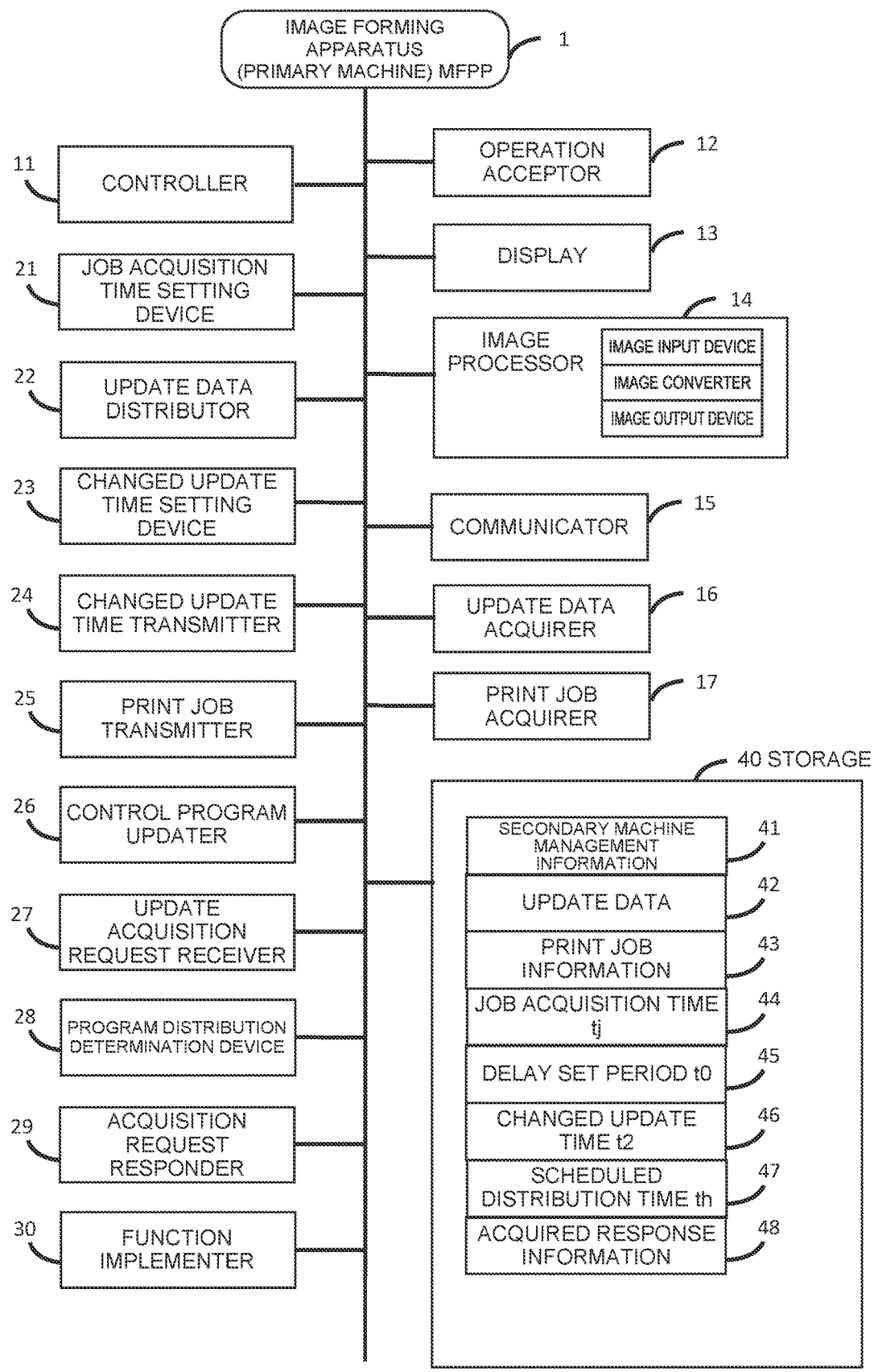
FIG. 2 is a configuration block diagram of an example of an image forming apparatus (a primary machine) according to the present disclosure.

FIG. 2 is a configuration block diagram of an example of the image forming apparatus (the primary machine) according to the present disclosure.

In FIG. 2, the image forming apparatus (the primary machine) MFPP according to the present disclosure mainly includes a controller 11, an operation acceptor 12, a display 13, an image processor 14, a communicator 15, an update data acquirer 16, a print job acquirer 17, a job acquisition time setting device 21, an update data distributor 22, a changed update time setting device 23, a changed update time transmitter 24, a print job transmitter 25, a control program updater 26, an update acquisition request receiver 27, a program distribution determination device 28, an acquisition request responder 29, a function implementer 30, and a storage 40.

Here, as will be described below, the image processor 14 mainly includes an image input device, an image converter, and an image output device.

Each of the update acquisition request receiver 27, the program distribution determination device 28, and the acquisition request responder 29 is a functional block that is operated when the secondary machine MFPC requests to acquire the update data.

The controller 11 is a component that controls operation of other components such as the display 13 and the image processor 14, and is mainly constructed of a CPU, ROM, RAM, an I/O controller, a timer, and the like.

The CPU organically actuates various types of hardware on the basis of control programs that are stored in nonvolatile memory such as the ROM in advance, and implements an image forming function, an update data distribution function, and the like of the present disclosure.

Of the above components, each of the job acquisition time setting device 21, the changed update time setting device 23, the program distribution determination device 28, and the like is a functional block for which the CPU executes processing thereof on the basis of a predetermined program.

The operation acceptor 12 is an input device for the user of the primary machine MFPP to perform a predetermined input operation. For example, the operation acceptor 12 is a component used to input information, such as characters, and select and input the function. A touch panel, a key for a specific use, or the like, is used as the operation acceptor 12. Examples of keys operated by the user are an operation start key, a function selection key, and a setting key.

For example, the user executes reading of a document by operating the touch panel or by an input operation of a reading operation start key, and starts an operation to transmit information such as the image data to a predetermined destination by an input operation of a transmission start key to start transmission of the information.

The display 13 is a component that displays information, and displays required information to implement each of the functions, an implementation result of the function, and the like for the user. For example, in the case where an LCD, an organic EL display, or the like is used for the display 13, and the touch panel is used as the operation acceptor 12, the display 13 and the touch panel are arranged in a superimposed manner.

For example, the display 13 displays setting of a setting item, which is used for printing or the like by the primary machine MFPP, required information to implement the document reading function and the like, an operation screen for the selected function, and the like by using characters, symbols, graphics, images, icons, animations, videos, and the like.

In the present disclosure, for example, the display 13 may display that the update data has been received when the update data is received, and the display 13 may display that the control program is currently updated when the control program is updated using the update data.

The image processor 14 is a component that implements the image forming function as a main function of the primary machine MFPP, and mainly includes the image input device, the image converter, and the image output device.

Primarily, the image input device is a component that inputs the image data in a predetermined format, the image converter is a component that converts the input image data into data with image quality and in a format suited for an application such as printing or screen display, and the image output device is a component that outputs the data acquired as a result of the conversion onto printing paper or the like, and transmits such printing paper or the like to another device via the network.

The image input device is a component that inputs the image data of the document including an image, text, a graphic, and the like, such as the print data intended to be printed. For example, the image input device is a component that optically reads the document placed on a document table or the like and that acquires image data of a print target included in print job information 43, which the print job acquirer 17 described below has received from another device.

A scanner (a reader) is used as the image input device that optically reads the document on which the information is written.

In order to read the document, the primary machine MFPP includes: a document placement table (the document table) on which the document is placed; and a document cover that presses the document.

The primary machine MFPP may also include an automatic document feeder (ADF) that receives plural sheets of the placed document and reads the document while automatically conveying the plural sheets of the document one by one.

In the case where the data is received from another device via the network, the print data that is included in the received data may be the image data itself as the print target, or may be the data in the predetermined format for generating an image such as a page description language.

Various methods are available as a method for inputting image information. For example, the document with the image and the like is scanned by the scanner, and then the image data of the document (hereinafter referred to as input image data) is stored in the storage 40.

For example, an interface, to which the external storage medium such as the USB flash drive is connected, corresponds to the image input device.

An electronic data file of the image information to be input, and the like, may be saved in the external storage medium such as the USB flash drive, the USB flash drive or the like may be connected to the input interface such as a USB terminal, and the predetermined input operation may be performed on the operation acceptor 12, so as to retrieve the desired electronic data file saved in the USB flash drive or the like and store the desired electronic data file as the input image data in the storage 40.

For example, the image converter executes various types of image processing on the basis of the input image data in an RGB format, which has been read by the scanner and stored in the storage 40, and converts such image data into image data in a CMYK format that is suited for printing. In addition, the image converter analyzes and renders a page description language, so as to convert the above image data into printable image data. Alternatively, when outputting an image for screen display, the image converter converts resolution. The image data that is acquired through the conversion by the image converter (hereinafter referred to as output image data) may be stored again in the storage 40, or may directly be output from the image output device.

The image output device is a component that outputs output the output image data. For example, the image output device creates an image by an electrophotographic method and fixes the created image onto the printing paper.

However, output of the image data is not limited to printing thereof but also includes transmission of the image data to another communicator by faxing via a telephone line, an e-mail, the FTP, or the like via the network such as the Internet.

Writing and storing the output image data in the external storage medium such as the USB flash drive also correspond to the image output.

The communicator 15 is a component for data communication with another communicator via the network 10.

As illustrated in FIG. 1, the primary machine MFPP is connected to the distribution server (SV) 3 and the information processing terminal (TE) 4, which is owned by the user, via the network 10.

The image forming apparatus (MFP) 1 is also connected to another image forming apparatus MFP via the network 10.

For example, the primary machine MFPP receives the update data that is transmitted from the distribution server (SV) 3 and information on the print job and the like that is transmitted from the information processing terminal (TE) 4 by the communicator 15. Alternatively, the primary machine MFPP transmits an update data query request and the like to the distribution server SV and the like via the network 10.

The update data acquirer 16 is a component that acquires the update data transmitted from the distribution server SV.

In principle, the primary machine MFPP inquires of the distribution server SV about availability of the update data. Then, in the case where the update data is available, the primary machine MFPP transmits an update software query request to request for distribution of the update data. Thereafter, in the case where the new update data is stored in the distribution server SV, as a response to the query request, the distribution server SV transmits the new update data to the primary machine MFPP.

However, The distribution server SV may automatically transmit the new update data to the primary machine MFPP at a time point at which the new update data is stored in the distribution server SV.

For example, the update software query request may be transmitted to the distribution server SV periodically (daily or at fixed time), or may be transmitted to the distribution server SV when a management administrator of the primary machine MFPP performs the predetermined input operation on the primary machine MFPP.

The acquired update data is stored in the storage 40 in order to be distributed (transferred) to the secondary machine MFPC.

The print job acquirer 17 is a component that acquires the print job including data to be processed in the image forming apparatus MFP.

In general, a functional block that acquires the job including the data to be processed in the information processing apparatus will be referred to as a job acquirer, and the job acquirer includes the print job acquirer 17. For example, the job acquirer also includes a reading job acquirer, an image recognition job acquirer, a transmission job acquirer, and the like.

For example, the print job may directly be input by the user or may be generated through a document reading operation in the primary machine MFPP.

Alternatively, the print job that is generated by the information processing terminal TE owned by the user may be received by using the communicator 15 via the network 10.

The acquired print job is stored as the print job information 43 in the storage 40.

In addition, for example, a print start operation specifying such a print job is performed in the primary machine MFPP, the image data that is included in the print job is printed.

The job acquisition time setting device 21 is a component that sets and stores time at which the print job acquirer 17 acquires the print job. In general, the time at which the job is acquired will be referred to as job acquisition time.

The time at which the print job is acquired is stored as job acquisition time (tj) 44 in the storage 40.

The update data distributor 22 is a component that distributes the acquired update data to the secondary machine MFPC after predetermined scheduled distribution time passes. The predetermined scheduled distribution time is time (th) 47 that is stored in the storage 40, which will be described below, and is set by the update data distributor 22.

For example, as timing to distribute the update data to the secondary machine MFPC, time at which the update data is acquired is set as the scheduled distribution time th in the case where it is set in advance that the update data is distributed to the secondary machine MFPC as soon as the update data is acquired from the distribution server SV.

Here, the scheduled distribution time th may be set on the basis of presence or absence of the print job that is stored in the primary machine MFPP.

For example, in the case where the print job acquirer 17 acquires the one or plural print jobs, the job acquisition time setting device 21 may set and store the job acquisition time tj for each of the acquired jobs, the update data distributor 22 may set the scheduled distribution time th by using the job acquisition time tj of the last acquired print job among the job acquisition times tj that have been set and stored, and the update data may be distributed to the secondary machine when the scheduled distribution time th, for which current time is set, elapses.

It is difficult to fixedly determine this predetermined post-acquisition period. However, since the user stores the print job in the primary machine MFPP for a purpose of printing the print job, it is considered that an operation to start printing the print job is highly likely to be performed after the print job is stored in the primary machine MFPP, for example, within a relatively short period such as 5 or 10 minutes.

Thus, in the case where the control program update processing using the update data is started within the predetermined post-acquisition period, such a situation possibly occurs where timing for executing the print job overlaps timing of the control program update processing, which causes the execution of the print job to wait until termination of the update processing.

In order to avoid the situation, where the execution of the print job that the user has attempted to execute has to be waited, as much as possible, the update data is preferably distributed to the secondary machine MFPC at timing that is determined on the basis of information on the print job stored in the primary machine MFPP instead of distributing the update data to the secondary machine MFPC immediately after the update data is acquired. For example, as will be described below, in the case where the print job is stored in the primary machine MFPP, the scheduled distribution time th is set by using the time at which the print job is acquired (the job acquisition time tj).

In this case, the update data is distributed to the secondary machine MFPC when the current time has passed the set scheduled distribution time th after the acquisition of the update data. Hereinafter, the current time will also be denoted by a reference symbol TN.

In addition, as will be described below, in the case where the scheduled distribution time th is set, and the print job acquirer 17 acquires the new print job before the scheduled distribution time th comes, the job acquisition time setting device 21 may set and store a second job acquisition time tj, at which the new print job has been acquired, and the update data distributor 22 may change the scheduled distribution time th by using the second job acquisition time tj that has been set and stored.

Furthermore, as described above, the update data distribution timing is mainly managed by the primary machine MFPP. However, instead of automatically distributing the update data at the timing that is set by the primary machine MFPP, the update data may be distributed to the secondary machine MFPC when the primary machine MFPP receives an update data acquisition request from the secondary machine MFPC.

In this case, as will be described below, the update data distributor 22 sets the scheduled distribution time th, which is the scheduled time to distribute the update data to the secondary machine MFPC, by using the job acquisition time tj that has been set and stored. Then, when the current time has passed the set scheduled distribution time th after reception of the update data acquisition request from the secondary machine MFPC, the acquired update data is distributed to the secondary machine MFPC.

As described above, there are at least three types of the update data distribution timing in the cases that are: the case where the update data is distributed to the secondary machine MFPC immediately after the acquisition of the update data; the case where the scheduled distribution time (th) is set by using the time at which the print job is acquired (the job acquisition time tj) when the print job is stored in the primary machine MFPP; and the case where the update data is distributed to the secondary machine MFPC when the update data acquisition request from the secondary machine MFPC is received. However, it is preferred to set and store in advance which of the distribution timings is adopted in the primary machine MFPP and the secondary machine MFPC.

The changed update time setting device 23 is a component that, when acquiring the print job, changes scheduled time to execute the control program update processing by using the update data and sets changed update time as scheduled time after the change.

The changed scheduled time is stored as changed update time 46 (t2) in the storage 40. As will be described below, the changed update time t2 is set from the job acquisition time tj described above and a predetermined delay set period t0 (t2=tj+t0).

For example, in the case where the job acquisition time tj is Sep. 24, 2021, 11:00, and the delay set period t0 is set to 20 minutes in advance, the changed update time t2 is set to Sep. 24, 2021, 11:20.

When the print job is acquired, usually, printing processing is thereafter executed by the print job. However, by setting the changed update time t2, it is possible to avoid that the execution of the print job has to be waited due to execution of the control program update processing immediately before or during the execution of the print job.

It is assumed that, as the delay set period to, a period, for which an execution period of the typical printing processing by the print job is considered, is set in advance.

As described above, the changed update time transmitter 24 is a component that transmits the set changed update time t2 to each of the secondary machines MFPC.

The secondary machine MFPC that has received the changed update time t2 updates scheduled update start time T, which will be described below, to the changed update time t2 when a specified condition is satisfied.

The print job transmitter 25 is a component that transmits data on the requested print job to the secondary machine MFPC when the secondary machine MFPC requests the print job.

The secondary machine MFPC that has received the print job data analyzes various types of data included in the print job, and executes the printing processing.

The control program updater 26 is a component that updates the control program of the primary machine MFPP by using the update data.

Alternatively, the control program updater 26 may execute processing to replace the control program with the update program.

The update acquisition request receiver 27 is a component that receives the update data acquisition request transmitted from the secondary machine MFPC.

For example, in the secondary machine MFPC, in the case where the current time TN passes the scheduled update start time T, the update data acquisition request is transmitted from the secondary machine MFPC to the primary machine MFPP.

In the case where the update data is stored in the storage 40 of the primary machine MFPP that has received the update data acquisition request, the primary machine MFPP determines whether to distribute the update data to the secondary machine MFPC.

The program distribution determination device 28 is a component that determines whether to distribute the update data to the secondary machine MFPC.

As described above, the program distribution determination device 28 determines whether to distribute the update data when receiving the update data acquisition request from the secondary machine MFPC.

For example, in the case where the update data is not stored in the storage 40 of the primary machine MFPP, or in the case where the control program of the secondary machine MFPC has already been updated to the latest control program, the program distribution determination device 28 determines that there is nothing to distribute.

On the other hand, a case where the update data is stored in the storage 40 of the primary machine MFPP but the current time TN has passed the scheduled distribution time th described above corresponds to a state where the user does not hold the print job that is likely to be processed by using the secondary machine within a certain period. Thus, the program distribution determination device 28 determines that the update data should be distributed to the secondary machine MFPC.

Meanwhile, a case where the current time TN has not passed the scheduled distribution time th corresponds to a state where the print job, which has just been submitted by the user, is held and the user is likely to use the secondary machine in the near future. Thus, the program distribution determination device 28 determines that the update data should not be distributed to the secondary machine MFPC yet.

As will be described below, a result of the determination by the program distribution determination device 28 is transmitted as acquisition response information to the secondary machine MFPC that has transmitted the update data acquisition request.

The acquisition request responder 29 is a component that generates a response to the update data acquisition request transmitted from the secondary machine MFPC and transmits the response to the secondary machine MFPC.

The response to the update data acquisition request will be referred to as the acquisition response information.

For example, as contents of the acquisition response information, the following three types of the response information are available in a manner to correspond to the above determination result.

Response 1: Response without the update data (there is no update data that has to be applied.)

Response 2: Retry response (the update data is available, but it is not yet time to distribute.)

Response 3: Updatable response (the update data is available, and it is time to update.)

For example, as described above, in the case where the update data is not stored in the storage 40 of the primary machine MFPP, there is nothing to distribute. Thus, the acquisition response information meaning "the response without the update data" is generated and transmitted to the secondary machine MFPC.

Meanwhile, in the case where the update data is stored in the storage 40 of the primary machine MFPP, and the current time TN has passed the scheduled distribution time th, the acquisition response information meaning "the updatable response" is generated and transmitted to the secondary machine MFPC. In this case, the update data that is stored in the storage 40 is transmitted to the secondary machine MFPC.

Furthermore, in the case where the update data is stored in the storage 40 of the primary machine MFPP, and the current time TN has not passed the scheduled distribution time th, the acquisition response information meaning "the retry response" is generated and transmitted to the secondary machine MFPC.

In this case, although the update data is stored, the update data is not yet transmitted to the secondary machine MFPC.

The function implementer 30 is a component that implements a predetermined function that can be implemented by the image forming apparatus MFP.

In the case where the image forming apparatus MFP is the multifunction peripheral that has the various functions described above, the selected function is implemented, for example, when the user performs the input operation to select the desired function.

Similar to the secondary machine MFPC, the primary machine MFPP also has the image forming function. Thus, for example, when the user selects the copy function, copy operation is performed on the document that is placed on the document table.

The storage 40 is a component that stores required information and a required program to implement each of the functions of the image processing apparatus (the primary machine) MFPP according to the present disclosure. As the storage 40, a semiconductor storage device such as ROM, RAM, or a flash drive, a storage device such as an HDD or an SSD, or another storage medium is used.

The information that is fixedly set in advance and is not changed is stored in memory such as the ROM, the information that is fixedly set in advance and may be changed is stored in the nonvolatile memory such as the flash drive or the HDD, and the information that is stored temporarily is stored in volatile memory such as the RAM, the flash drive, the HDD, or the like.

For example, the storage 40 stores secondary machine management information 41, update data 42, the print job information 43, job acquisition time 44, a delay set period 45, changed update time 46, scheduled distribution time 47, acquired response information 48, and the like.

The storage 40 also stores the control program that implements the function of the own primary machine MFPP.

FIG. 5 includes explanatory views of examples of the information stored in the storage 40 of the image forming apparatus (the primary machine).

The secondary machine management information 41 is information used to identify the image forming apparatus (the secondary machine) and includes, for example, a device name, a model name, a serial number, an IP address, an installation location, information on optional functions, and a version information of the control program, and the like of the secondary machine MFPC.

For example, the print job and the update data are transmitted to the secondary machine MFPC by using the IP address.

As described above, the update data 42 is a program for updating the control program of the image forming apparatus, and is mainly acquired from the distribution server SV. However, the update data 42 may directly be input into the primary machine MFPP by the management administrator of the primary machine MFPP or the like.

The update data 42 includes both of the update data used to update the control program of the primary machine MFPP and the update data used to update the control program of the secondary machine.

In the case where the update data 42 is a common program to all the secondary machines MFPC, the update data is distributed to all the secondary machines MFPC.

Alternatively, in the case where the update data 42 is a program for a particular function, the update data may be distributed only to the secondary machine MFPC that has such a particular function.

However, in the following embodiment, a description will be made that the update data 42 is the common program to all the secondary machines MFPC and is distributed to all the secondary machines MFPC.

The print job information 43 is information that is used when the printing function is implemented, and includes information on the user who has registered the print job, information specifying a paper feed tray and a paper discharge tray, another type of control information, and the image data as the print target.

In the present disclosure, the print job information 43 is received from the information processing terminal TE and is temporarily saved in the primary machine MFPP. In the case where the secondary machine MFPC requests the print job information 43, the requested print job information 43 is transmitted to the secondary machine MFPC.

In addition, in the case where the printing function of the primary machine MFPP is selected to print the image data of the print job information 43, the printing processing is executed in the primary machine MFPP.

The job acquisition time 44 is the time (tj) at which the job is acquired, and is set by and stored in the job acquisition time setting device 21.

For example, as illustrated in FIG. 5, date information (2021.09.25, 11:00) meaning Sep. 25, 2021, 11:00 is stored as the job acquisition time tj.

The job acquisition time (tj) 44 is used to set the changed update time 46 and the scheduled distribution time 47.

The delay set period 45 is a period (t0) for which a period from time at which the job is registered in the primary machine to time at which the secondary machine is operated and starts printing or to time at which printing is completed. The delay set period 45 is also information that is set in advance in order to prevent the control program from starting updated during a period from time at which the primary machine acquires the print job to time at which the user operates the secondary machine and executes the print job.

For example, as illustrated in FIG. 5, the delay set period (t0) 45 is set to a period of 20 minutes.

Here, it is assumed that the user who manages the primary machine sets a fixed period. However, the delay set period (t0) 45 may automatically be determined the primary machine traces history of the past print jobs and statistically analyzes the period from the registration to the execution.

The delay set period (t0) 45 is used to set the changed update time 46 and the scheduled distribution time 47.

The changed update time 46 corresponds to scheduled time (t2) at which the control program update processing is executed using the update data, and is time that is set by the changed update time setting device 23 described above and is transmitted to the secondary machine MFPC by the changed update time transmitter 24.

As the scheduled time, at which the update processing is executed, predetermined time is set as a default value in each of the secondary machines MFPC.

In the case where no print job is acquired, the default time is adopted as is as the scheduled time at which the update processing is executed.

However, in the case where the print job is acquired, it is preferred to avoid the printing processing by the print job from being postponed due to the control program update processing. Thus, this scheduled time, at which the update processing is executed, is changed. The changed update time (t2) 46 is time that is set when the print job is acquired. Thus, by transmitting the changed update time (t2) 46 to each of the secondary machines MFPC, the update processing, which is executed in the secondary machine MFPC, is postponed to the changed update time (t2) 46.

The changed update time (t2) 46 is set in a manner to correspond to the time at which the print job is acquired. For example, time that is acquired by adding the delay set period t0 to the job acquisition time tj described above is set as the changed update time (t2) 46 (t2=tj+t0).

As illustrated in FIG. 5, in the case where the job acquisition time tj is Sep. 25, 2021, 11:00, and the delay set period t0 is 20 minutes, the changed update time t2 is set to Sep. 25, 2021, 11:20 by t2=tj+t0.

The scheduled distribution time 47 is the scheduled time (th) at which the update data is distributed to the secondary machine MFPC. In principle, after a lapse of this scheduled time th, the update data distributor 22 distributes the update data to the secondary machine MFPC.

As the scheduled distribution time (th) 47, predetermined time is set as a default value. In the case where no print job is acquired, the default time is used.

However, as described above, in the case where the primary machine MFPP has acquired the print job, the print job is highly likely to be executed by the primary machine MFPP within a predetermined period, or the secondary machine MFPC is highly likely to make a printing processing request of the print job. Accordingly, the scheduled distribution time (th) 47 is changed according to the print job acquisition time.

For example, the scheduled distribution time th is time later than the job acquisition time tj of the last acquired print job, and, as the scheduled distribution time th, time that is acquired by adding the delay set period t0, which is stored in the storage 40 in advance, to the job acquisition time tj of the last acquired print job may be set.

In the case where the plural print jobs are acquired consecutively at different times, the time at which the print job is acquired is stored in the storage 40 for each of the print jobs. In this case, the job acquisition time tj of the last acquired print job among the acquired print jobs is retrieved, and the time, which is acquired by adding the delay set period t0 described above to this job acquisition time tj, is set as the scheduled distribution time (th) 47 (th=tj+t0).

After the current time TN passes the scheduled distribution time (th) 47, the update data is distributed to the secondary machine MFPC.

As illustrated in FIG. 5, in the case where the job acquisition time tj of the last acquired print job is Sep. 25, 2021, 11:00, and the delay set period t0 is 20 minutes, the scheduled distribution time (th) 47 is set to Sep. 25, 2021, 11:20 by th=tj+t0.

As described above, the acquired response information 48 is a response to the update data acquisition request that is transmitted from the secondary machine MFPC.

For example, as illustrated in FIG. 5, "01" in the acquired response information 48 corresponds to the response without the update data as the response 1, "02" in the acquired response information 48 corresponds to the retry response as the response 2, and "03" in the acquired response information 48 corresponds to the updatable response as the response 3.

The acquired response information 48, which includes any information (01, 02, or 03) of the three pieces of the response information (the responses 1, 2, 3) as described above, is transmitted to the secondary machine MFPC.

Figure 3:
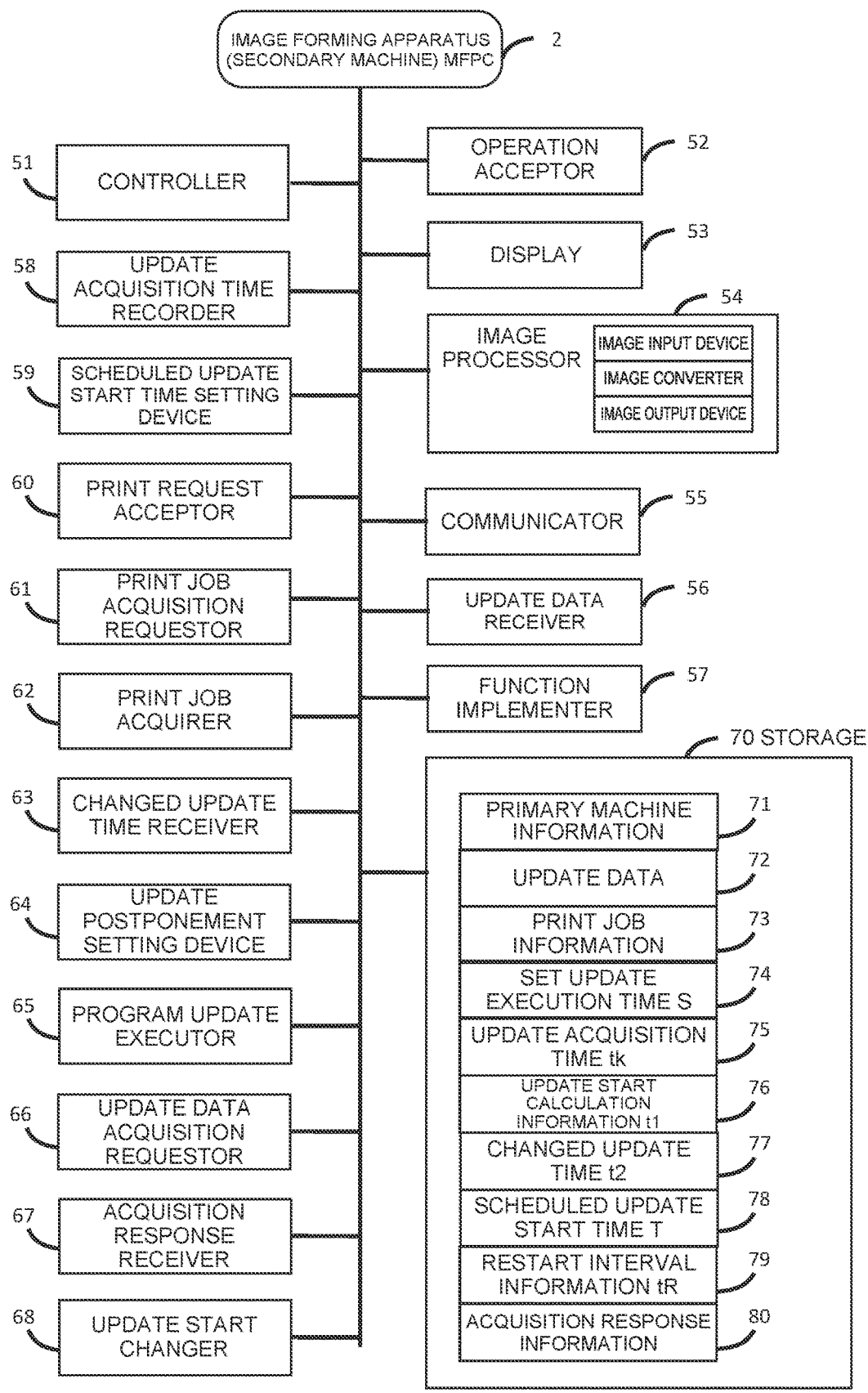
FIG. 3 is a configuration block diagram of an example of an image forming apparatus (a secondary machine) according to the present disclosure.

Configuration of Image Forming Apparatus (Secondary Machine) FIG. 3 is a configuration block diagram of an example of the image forming apparatus (the secondary machine) according to the present disclosure.

In FIG. 3, the image forming apparatus (the secondary machine) MFPC according to the present disclosure mainly includes a controller 51, an operation acceptor 52, a display 53, an image processor 54, a communicator 55, an update data receiver 56, a function implementer 57, an update acquisition time recorder 58, a scheduled update start time setting device 59, a print request acceptor 60, a print job acquisition requestor 61, a print job acquirer 62, a changed update time receiver 63, an update postponement setting device 64, a program update executor 65, an update data acquisition requestor 66, an acquisition response receiver 67, an update start changer 68, and a storage 70.

Here, the operation acceptor 52, the display 53, the image processor 54, and the communicator 55 are functional blocks, each of which executes similar processing to that by the respective component of the primary machine described above, and the image processor 54 mainly includes an image input device, an image converter, and the image output device. Since details of these functional blocks are the same as those of the primary machine, a description thereon will not be made.

Each of the update data acquisition requestor 66, the acquisition response receiver 67, and the update start changer 68 is a functional block that is operated when the secondary machine MFPC makes the update data acquisition request to the primary machine MFPP.

The controller 51 is a component that controls operation of other components such as the operation acceptor 52 and the image processor 54, and is mainly constructed of a CPU, ROM, RAM, an I/O controller, a timer, and the like.

The CPU organically actuates various types of hardware on the basis of control programs that are stored in nonvolatile memory such as the ROM in advance, and implements the image forming function and the like of the present disclosure.

Of the above components, each of the update acquisition time recorder 58, the scheduled update start time setting device 59, the print request acceptor 60, the update postponement setting device 64, the update start changer 68, and the like is a functional block for which the CPU executes processing thereof on the basis of a predetermined program.

The update data receiver 56 is a component that receives the update data transmitted from the primary machine MFPP.

In principle, when the secondary machine MFPC receives the update data, the update data is used to update the control program.

Alternatively, in the case where the scheduled update start time is set, the control program is updated by using the received the update data when the current time TN passes the scheduled update start time.

Similar to the primary machine MFPP described above, the function implementer 57 is a component that implements the predetermined function that can be implemented by the image forming apparatus MFP. For example, when the user performs the input operation to select the desired function, the selected function (for example, the printing function) is implemented.

The update acquisition time recorder 58 is a component that records update acquisition time tk when the update data distributed from the primary machine MFPP is received.

The update acquisition time tk is time at which the update data is received, for example.

The update acquisition time tk is used to set the update start calculation information t1, which will be described below, and the scheduled update start time T is further set from the update start calculation information t1.

The scheduled update start time setting device 59 is a component that sets the scheduled update start time T by using the recorded update acquisition time tk.

The scheduled update start time T is time to start updating the control program, which implements the functions of the secondary machine MFPC, by using the received update data in the secondary machine MFPC.

For example, the scheduled update start time setting device 59 sets the scheduled update start time T to a date that is later than the recorded update acquisition time tk and that is equal to a portion of hour and minute information set at set update execution time S.

In the case where the update data is received and the update acquisition time tk is set as described above, first, the update start calculation information t1 is set.

The update start calculation information t1 is time information used to set the scheduled update start time T, and is set from the set update execution time S and the update acquisition time tk, which are set and stored in advance for each of the secondary machines MFPC.

The set update execution time S is a default value of the time information, at which the control program starts updated by using the update data. Year, month, and day are not set for the set update execution time S, and only the hour and minute information is set therefor. For example, the hour and minute information such as 3:00 is initially set as the set update execution time S, and is stored in the nonvolatile memory such as the HDD.

As the set update execution time S, the same time information may be set and stored in advance for all the secondary machines MFPC. However, the set update execution time S may be changeable to the different time information per secondary machine MFPC in a manner to correspond to an installation status of each of the secondary machines MFPC, such as the installation location, an operation time zone, and the like of the secondary machine MFPC.

In consideration of this set update execution time S, the update start calculation information t1 is set to a date which is later than the update acquisition time tk and the portion of whose hour and minute information is equal to the set update execution time S. The portion of year, month, and day in the update start calculation information t1 only needs to be the time that is later than year, month, and day of the update acquisition time tk. For example, year, month, and day in the update start calculation information t1 may be year, month, and day of the next set update execution time S, or may be a next day of year, month, and day of the update acquisition time tk.

For example, in the case where the update acquisition time tk as the time, at which the update data is received, is Sep. 24, 2021, 16:00, and the set update execution time S is 3:00, year, month, and day that is later than the update acquisition time tk and on which the next set update execution time S comes is Sep. 25, 2021 that is a day after the update acquisition time tk. Thus, the date of Sep. 25, 2021, 3:00 is set as the update start calculation information t1.

Meanwhile, in the case where the update acquisition time tk is Sep. 25, 2021, 1:00, and the set update execution time S is 3:00, year, month, and day on which the next set update execution time S comes is Sep. 25, 2021 that is the day of the update acquisition time tk. Thus, the date of Sep. 25, 2021, 3:00 is set as the update start calculation information t1.

Next, this set update start calculation information t1 is used as a default value of the scheduled update start time T.

For example, when the update data is received for the first time, the scheduled update start time T is set to the update start calculation information t1 as is (T=t1).

Then, each time the new update data is received, a different date is set in the update start calculation information t1. Thus, the scheduled update start time T is also changed to the same date as that in t1.

However, as will be described below, in the case where the changed update time t2 is received from the primary machine MFPP, the setting of the scheduled update start time T is changed in a manner to correspond to the changed update time t2. In this case, the scheduled update start time T is postponed.

For example, in the case where the update start calculation information t1, which is set at the scheduled update start time T, is Sep. 25, 2021, 3:00, the changed update time t2, which is received from the primary machine MFPP, is Sep. 25, 2021, 3:10, and this t2 is a later date than t1. Thus, the scheduled update start time T is changed (postponed) to the changed update time t2 (T=t2).

When the new print job is stored in the primary machine MFPP, the scheduled update start time T is changed, just as described, in order to avoid the printing processing of the print job from overlapping the control program update processing at the same time as much as possible and to avoid the printing processing from being postponed by the control program update processing.

The print request acceptor 60 is a component that accepts a print job execution request from the user by using the operation acceptor and the display.

For example, in the secondary machine MFPC, in response to the predetermined input operation on the operation acceptor by the user, the print request acceptor 60 acquires and displays the information on the print job, which is saved in the primary machine via the network and is registered by this user, in a list on the operation acceptor. Furthermore, the print request acceptor 60 accepts the execution request for the print job, which is selected by the user's input operation.

The print job acquisition requestor 61 is a component that, when accepting the print request from the user, transmits an acquisition request for the print job, the print request for which has been made, (a print job data request) to the primary machine MFPP.

The print job data request includes information on the requested print job (for example, a job identification number or the like).

The print job acquirer 62 is a component that acquires the print job transmitted from the primary machine MFPP.

The acquired print job includes data for generating an image of the print target.

The changed update time receiver 63 is a component that receives the changed update time t2 transmitted from the primary machine MFPP.

As described above, in the case where the primary machine MFPP acquires the print job, the scheduled time, at which the control program update processing is executed by using the update data in the primary machine MFPP, is changed. In regard thereto, the changed update time receiver 63 receives the changed update time t2 as the changed scheduled time thereof.

The update postponement setting device 64 is a component that changes the scheduled update start time T by using the received changed update time t2.

For example, in the case where the changed update time t2 is received from the primary machine MFPP in the state where the update start calculation information t1 is set to the scheduled update start time T (T=t1), and where the changed update time t2 is later than the scheduled update start time T (t2>T), the scheduled update start time T is changed to the changed update time t2 (T=t2).

That is, the scheduled update start time T is postponed.

The program update executor 65 is a component that updates the control program of the secondary machine MFPC, which is stored in the storage 70, by using the received update data.

In the secondary machine MFPC, when the current time TN passes the scheduled update start time T, the program update executor 65 updates the control program by using the update data.

The update data acquisition requestor 66 is a component that transmits a request to acquire the update data (the update data acquisition request) to the primary machine MFPP.

This update data acquisition request is information that is transmitted when the secondary machine MFPC automatically acquires the update data at own timing, and is used when the update data acquisition timing is managed on the secondary machine MFPC side.

For example, when the current time TN has passed the predetermined scheduled update start time T, which is stored in the secondary machine MFPC, the update data acquisition requestor 66 transmits the update data acquisition request to the primary machine MFPP.

Alternatively, for example, in the case where the management administrator or the like performs the predetermined input operation, which corresponding to the update data acquisition request, on the secondary machine MFPC, the update data acquisition request may be transmitted to the primary machine MFPP.

In the case where the update data distribution timing is managed on the primary machine MFPP side, the update data acquisition request does not have to be used.

The acquisition response receiver 67 is a component that receives the acquisition response information, which is transmitted from the primary machine MFPP, in response to the update data acquisition request.

As described above, three types of the response contents are available for the acquisition response information. Thus, after the acquisition response information is received, processing that corresponds to the appropriate response content is executed.

For example, in the case where the acquisition response information including the updatable response is received, the update data is received from the primary machine MFPP, and the control program update processing is executed by using the update data.

The update start changer 68 is a component that resets the scheduled update start time T and resets time (timing) at which the update data acquisition request is transmitted. For example, in the case where the update acquisition request receiver 27 of the primary machine MFPP has received the update data acquisition request from the secondary machine MFPC and the current time TN has not passed the set scheduled distribution time th, as a response to the update data acquisition request, the acquisition request responder 29 transmits, to the secondary machine MFPC, the acquisition response information that includes the retry response indicating that it is not yet the distribution timing.

Thereafter, in the case where the acquisition response receiver 67 of the secondary machine MFPC receives the acquisition response information including the retry response, the update start changer 68 resets the scheduled update start time T to time that is acquired by adding predetermined restart interval information tR, which will be described below, to the current time TN.

As described above, in the primary machine MFPP that has received the update data acquisition request, the program distribution determination device 28 determines whether to distribute the update data to the secondary machine MFPC.

In the case where it is determined that, although the new update data is stored in the primary machine MFPP, it is not yet the distribution timing, the acquisition response information including the retry response is transmitted to the secondary machine MFPC.

Since the update data is not yet transmitted to the secondary machine MFPC that has received the acquisition response information including the retry response, in order to acquire the update data, the secondary machine MFPC has to transmit the update data acquisition request to the primary machine MFPP again.

In addition, since there is a case where the current time TN has already passed the scheduled update start time T, the scheduled update start time T has to be reset (postponed).

Thus, in the case where the acquisition response information including the retry response is received, the scheduled update start time T is reset (postponed), and time (timing) at which the update data acquisition request is transmitted to the primary machine MFPP is also reset.

For example, as will be described below, the scheduled update start time T and retransmission time of the update data acquisition request are set by using the restart interval information tR, which is set and stored in the storage 70 of the secondary machine MFPC in advance.

For example, an interval such as 5 minutes or 10 minutes is set in advance as the restart interval information tR.

In this case, the scheduled update start time T is set to time that is acquired by adding the restart interval information tR to the current time TN (T=TN+tR).

Meanwhile, for example, the retransmission time of the update data acquisition request may be set to time that is acquired by adding the restart interval information tR to time at which the acquisition response information including the retry response is received.

The storage 70 is a component that stores required information and a required program to implement each of the functions of the image processing apparatus (the secondary machine) MFPC according to the present disclosure. As the storage 70, a semiconductor storage device such as ROM, RAM, or a flash drive, a storage device such as an HDD or an SSD, or another storage medium is used.

For example, the storage 70 stores primary machine information 71, update data 72, print job information 73, set update execution time 74, update acquisition time 75, update start calculation information 76, changed update time 77, scheduled update start time 78, restart interval information 79, acquisition response information 80, and the like.

The storage 70 also stores the control program that implements the function of the own secondary machine MFPC.

FIG. 6 includes explanatory views of examples of information stored in the storage 70 of the image forming apparatus (the secondary machine).

The primary machine information 71 is information used to identify the image forming apparatus (the primary machine) and includes, for example, a device name, a model name, a serial number, an IP address, an installation location, and the like of the primary machine MFPP.

For example, the print job data request and the update data acquisition request are transmitted to the primary machine MFPP by using the IP address.

The update data 72 is a program that is distributed from the primary machine MFPP, and corresponds to the update data 42 that is stored in the primary machine MFPP described above.

The print job information 73 is information that includes data for generating the image as the print target, and corresponds to the print job information 43 stored in the primary machine MFPP described above.

The set update execution time 74 is a default value (S) of time information at which the control program of the secondary machine MFPC starts updated by using the update data. For example, as illustrated in FIG. 6, as the set update execution time (S) 74, hour and minute information (03:00) meaning 3:00 is stored.

As described above, the update acquisition time 75 is the time (tk) at which the update data is received.

For example, as illustrated in FIG. 6, as the update acquisition time (tk) 75, date information (2021.09.24, 16:00) meaning Sep. 24, 2021, 16:00 is stored.

The update start calculation information 76 is time information (t1) used to set the scheduled update start time T.

For example, as illustrated in FIG. 6, as the update start calculation information (t1) 76, date information (2021.09.25, 03:00) meaning Sep. 25, 2021, 3:00 is stored.

As described above, the changed update time 77 is the same as the changed update time 46, which is the scheduled time to execute the control program update processing by using the update data, and is information (t2) transmitted from the primary machine MFPP. For example, as illustrated in FIG. 6, as the changed update time (t2) 77, date information (2021.09.25, 11:00) meaning Sep. 25, 2021, 11:00 is stored.

As described above, the scheduled update start time 78 is time (T) at which the control program of the secondary machine MFPC starts updated by using the received update data.

For example, as illustrated in FIG. 6, as the scheduled update start time (T 78, the date information (2021.09.25, 03:00) meaning Sep. 25, 2021, 3:00 is stored.

As described above, the restart interval information 79 is time information (tR) for resetting the scheduled update start time T and the retransmission time of the update data acquisition request.

For example, as illustrated in FIG. 6, as the restart interval information (tR) 79, interval information such as 30 minutes is stored.

As described above, the acquisition response information 80 is information that is transmitted from the primary machine MFPP to the secondary machine MFPC in response to the update data acquisition request transmitted from the secondary machine MFPC, and is the same information as the acquired response information 48 illustrated in FIG. 5, for example.

Figure 4:
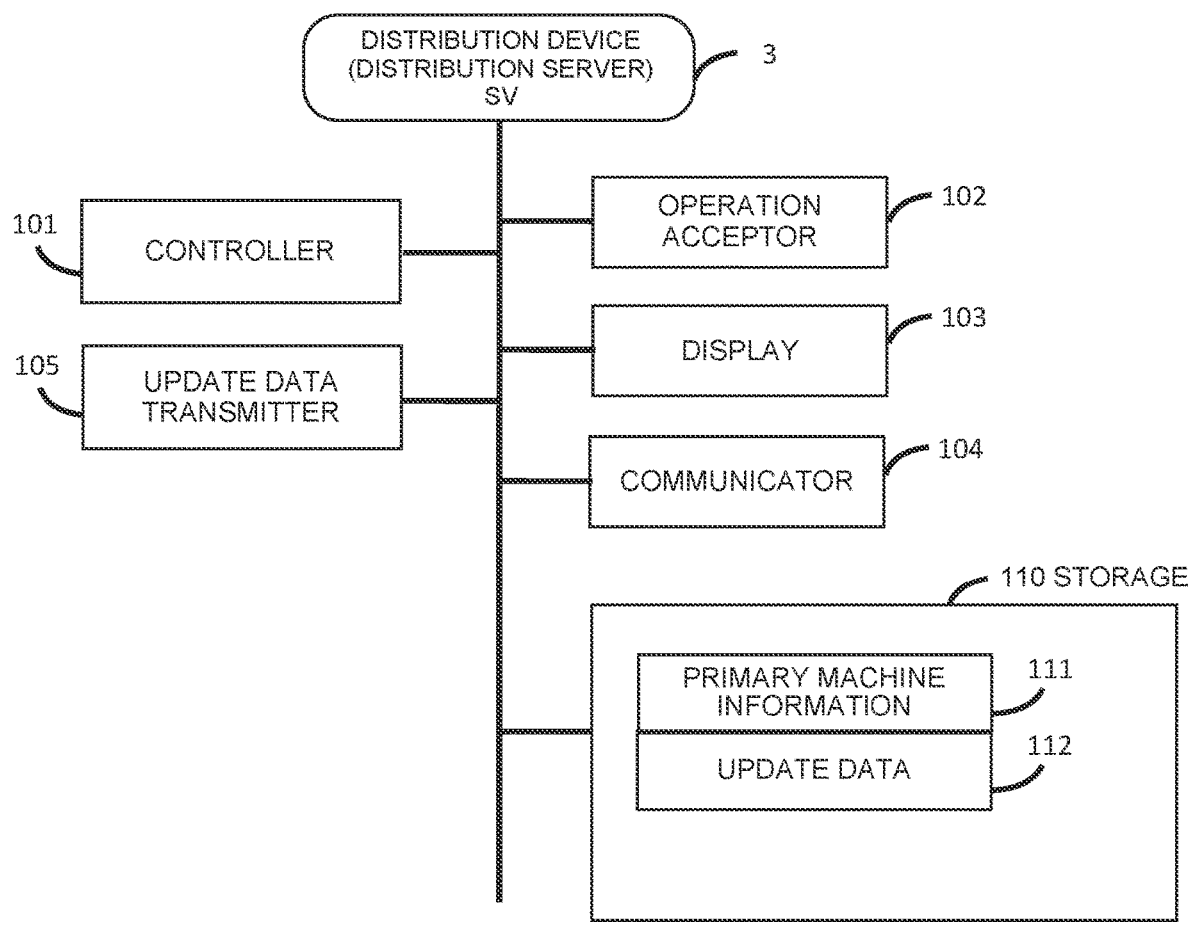
FIG. 4 is a configuration block diagram of an example of a distribution device according to the present disclosure.

Configuration of Distribution Device (Distribution Server) FIG. 4 is a configuration block diagram of an example of the distribution server according to the present disclosure.

In FIG. 4, the distribution server (SV) 3 according to the present disclosure mainly includes a controller 101, an operation acceptor 102, a display 103, a communicator 104, an update data transmitter 105, and a storage 110.

The controller 101 is a component that controls operation of other components such as the operation acceptor 102 and the display 103, and is mainly constructed of a CPU, ROM, RAM, an I/O controller, a timer, and the like.

The CPU organically actuates various types of hardware on the basis of control programs that are stored in nonvolatile memory such as the ROM in advance, and implements an update data transmission function and the like of the distribution server SV.

The operation acceptor 102 is an input device for the management administrator of the distribution server SV to perform a predetermined input operation. For example, the operation acceptor 102 is a component used to input information such as characters, and select and input the function. A keyboard, a mouse, and the like are used as the operation acceptor 102.

The display 103 is a component that displays information, and displays required information to implement each of the functions, an implementation result of the function, and the like for the management personnel. For example, the LCD, the organic EL display, or the like is used.

For example, the display 103 displays required information to generate and transmit the update data by using the characters, the symbols, the graphics, the images, the icons, the animations, the videos, and the like.

The communicator 104 is a component for data communication with the image forming apparatus MFP via the network 10.

For example, the communicator 104 receives the update software query request from the primary machine MFPP of the image forming apparatuses. Then, in the case where the update data for the image forming apparatus MFP exists, the communicator 104 transmits the update data to the primary machine MFPP.

The update data transmitter 105 is a component that transmits, to the primary machine MFPP, the update data used to update the control program. The control program is stored in the distribution server SV and implements the functions of the image forming apparatus.

In the following examples, it is assumed that the transmission of the update data includes transmission of the new control program itself to the primary machine MFPP.

As described above, for example, when receiving the update software query request that is transmitted from the primary machine MFPP, the update data transmitter 105 transmits the latest update data, which is stored in the storage 110, to the primary machine MFPP. Alternatively, even in the case where the update data transmitter 105 does not receive the update software query request, the update data transmitter 105 may transmit the new update data to the primary machine MFPP when such update data is stored in the distribution server SV.

The storage 110 is a component that stores the required information and the required program to implement each of the functions of the distribution server SV according to the present disclosure. As the storage 110, a semiconductor storage device such as ROM, RAM, or a flash drive, a storage device such as an HDD or an SSD, or another storage medium are used.

For example, the storage 110 stores primary machine information 111, update data 112, and the like.

The primary machine information 111 is information on the primary machine MFPP that is a transmission destination of the update data for the image forming apparatus, and at least the IP address and the like of the primary machine MFPP are stored therein.

The update data 112 is various pieces of data used to update the control program of the image forming apparatus. Alternatively, the update data 112 may be the new control program of the image forming apparatus itself.

Further alternatively, the update data 112 may be a common program to all of the image forming apparatuses (the primary machine MFPP and the secondary machine MFPC), but may be a program that varies by the model or the function of the image forming apparatus.

Control Program Update Processing: First Example

A description will herein be made on an example of a case where the update data distribution timing is managed in the primary machine MFPP.

In this example, in the case where the print job acquirer 17 acquires the print job, the update data distributor 22 sets the scheduled distribution time th, which is the scheduled time to distribute the update data to the other information processing apparatus (the secondary machine MFPC), by using the job acquisition time tj as the time at which the print job is acquired. Then, when the current time has passed the set scheduled distribution time th, the update data distributor 22 distributes the update data to the other information processing apparatus (the secondary machine MFPC).

In the case where the primary machine MFPP has acquired the update data from the distribution server SV and the print job, for which the printing processing is not completed, is not stored in the primary machine MFPP, it is considered that there is a low possibility of an overlap between the timing for executing the print job and the timing for updating the control program. Thus, there is no particular restriction on the distribution timing of the update data, and the update data may be distributed to each of the secondary machines MFPC as soon as the update data is acquired. Alternatively, the update data may be distributed when predetermined time, which is set in advance, comes.

Meanwhile, in the case where the print job, for which the printing processing is not completed, is stored in the primary machine MFPP, in order to avoid the postponement of the printing processing by the control program update processing, it is preferred to put a restriction on the distribution timing. Then, as will be described below, the update data is preferably distributed to each of the secondary machines MFPC after a lapse of a predetermined period from the time at which the print job is acquired.

In this way, the presence of the print job and the update data stored in the primary machine MFPP is not confirmed by the secondary machine MFPC. In addition, even in the case where the control program update processing is executed immediately after the reception of the update data, it is possible to reduce the possible occurrence of a situation where the timing for executing the print job overlaps the timing for updating the control program.

Figure 7:
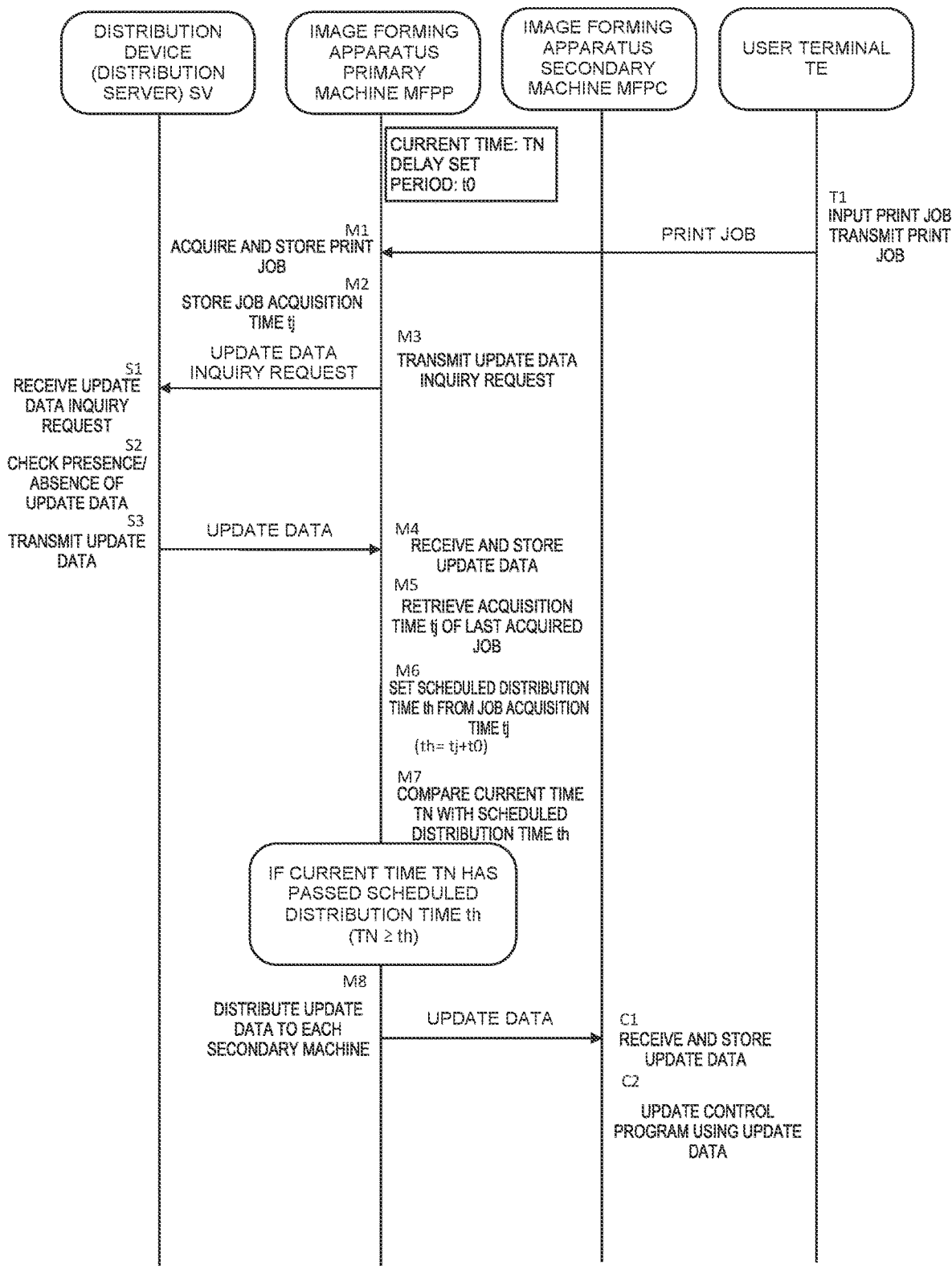
FIG. 7 illustrates a communication sequence in a first example of control program update processing in the program update system according to the present disclosure.

FIG. 7 illustrates a communication sequence in a first example of the control program update processing in the program update system.

In the following communication sequence, the update data will also be referred to as updated software.

In addition, FIG. 7 illustrates a communication sequence that is executed among the distribution server SV, the primary machine MFPP, the secondary machine MFPC, and the user terminal TE.

In this first example, it is assumed that the user does not perform the input operation to execute the print job on the secondary machine MFPC.

It is assumed that the primary machine MFPP at least stores the delay set period t0 in advance.

It is also assumed that all apparatuses including the primary machine MFPP have a clock function and can acquire the current time TN.

It is further assumed that the user terminal TE can be connected to the primary machine MFPP and stores, in advance, the information on the primary machine, such as the IP address of the primary machine MFPP, and user authentication information (an ID, a password PW, and the like) for connection with the primary machine MFPP.

It is assumed that, in step S1 of the user terminal TE illustrated in FIG. 7, the user creates document data and perform an operation to create the print job and transmit the print job to the primary machine MFPP, so as to print the document.

The print job includes the image data of the print target.

With this operation, the print job is transmitted from the user terminal TE to the primary machine MFPP.

Alternatively, the print job may automatically be transmitted to the primary machine MFPP when the user only performs an input operation of the created print job.

Here, the print job is set as the input job for description of the update processing. However, since there are the image forming apparatuses having a function other than the printing function, the input job may be a job other than the print job.

In step M1 of the primary machine MFPP, the primary machine MFPP acquires the print job and stores the print job as the print job information 43 in the storage 40.

In step M2, the primary machine MFPP stores the time at which the print job is acquired as the job acquisition time tj. The job acquisition time tj is stored in association with the print job.

In addition to the image data of the print target included in the print job, the print job information 43 may store identification information of the user terminal TE as a transmission source, a name of a creator of the print job, and a number to identify the job, and the like. Here, the job acquisition time tj and the print job information 43 are described as separate information for the purpose of description. However, the job acquisition time tj may also be included in the print job information 43.

In step M3, the primary machine MFPP transmits the update software query request to the distribution server SV.

In step S1 of the distribution server SV, the distribution server SV receives the update software query request.

In step S2, the distribution server SV checks whether the new update data, which has not been transmitted, is stored in the storage 110.

In step S3, in the case where the new update data, which has not been transmitted, is present, the distribution server SV transmits such update data to the primary machine MFPP. However, in the case where the new update data is absent, although not illustrated, "UPDATE SOFTWARE ABSENT RESPONSE" indicating that the update data is absent may be transmitted to the primary machine MFPP.

In step M4 of the primary machine MFPP, the primary machine MFPP receives and stores the update data.

In step M5, the primary machine MFPP retrieves the job acquisition time tj of the last acquired print job.

In FIG. 7, only one print job is acquired. Thus, the primary machine MFPP retrieves the job acquisition time tj of the print job that has been acquired in step M1.

However, in the case where the primary machine MFPP has already stored the plural print jobs, the primary machine MFPP retrieves the latest job acquisition time tj from the job acquisition times tj of the plural print jobs.

In step M6, the primary machine MFPP sets the scheduled distribution time th from the retrieved job acquisition time tj.

For example, the primary machine MFPP sets the scheduled distribution time th to the time, which is acquired by adding the delay set period t0 stored in advance to the retrieved job acquisition time tj (th=tj+t0).

In step M7, the primary machine MFPP compares the current time TN with the scheduled distribution time th.

If the current time TN matches the scheduled distribution time th or has passed the scheduled distribution time th (TN≥th), the processing proceeds to step M8.

On the other hand, if the current time TN has not passed the scheduled distribution time th (TN<th), that is, if the current time TN has not yet reached the scheduled distribution time th, the processing remains in step M7, and the primary machine MFPP periodically repeats the comparison between the current time TN and the scheduled distribution time th.

In step M8, if the current time TN has reached the scheduled distribution time th, the primary machine MFPP distributes the update data to the secondary machine MFPC.

Here, the primary machine MFPP uses the secondary machine management information 41, which is stored in the storage 40 in advance, to transmit the update data to all of the managed secondary machines MFPC in principle.

In step C1 of the secondary machine MFPC, the secondary machine MFPC receives and stores the update data.

In step C2, the secondary machine MFPC executes the update processing (updating) of the control program of the secondary machine MFPC by using the received update data.

The update processing may automatically be initiated as soon as the update data is received. However, the update processing is preferably executed after it is confirmed that the user is not operating the secondary machine MFPC and that any function of the secondary machine MFPC is not implemented.

As it has been described so far, in the case where the primary machine MFPP stores the print job, in consideration of the job acquisition time tj, the time at which the update data is distributed to the secondary machine MFPC (the scheduled distribution time th) is postponed to time after the lapse of the predetermined period (the delay set period t0) since the job acquisition time tj. Therefore, it is possible to reduce the possible occurrence of the situation where the timing for executing the print job overlaps the timing for updating the control program in the secondary machine MFPC.

Control Program Update Processing: Second Example

Similar to the first example, a description will also herein be made on an example of the case where the update data distribution timing is managed in the primary machine MFPP. However, in this second example, a description will be made on a case where the user performs the input operation to execute the print job on the secondary machine MFPC and the scheduled distribution time th is changed in a state where the update data has not yet been distributed to the secondary machine MFPC.

The second example is the same as the first example in points that the update data is distributed to each of the secondary machines MFPC after the lapse of the predetermined period since the time at which the print job is acquired and that the control program update processing is executed in the secondary machine MFPC immediately after the update data is received.

Figure 8:
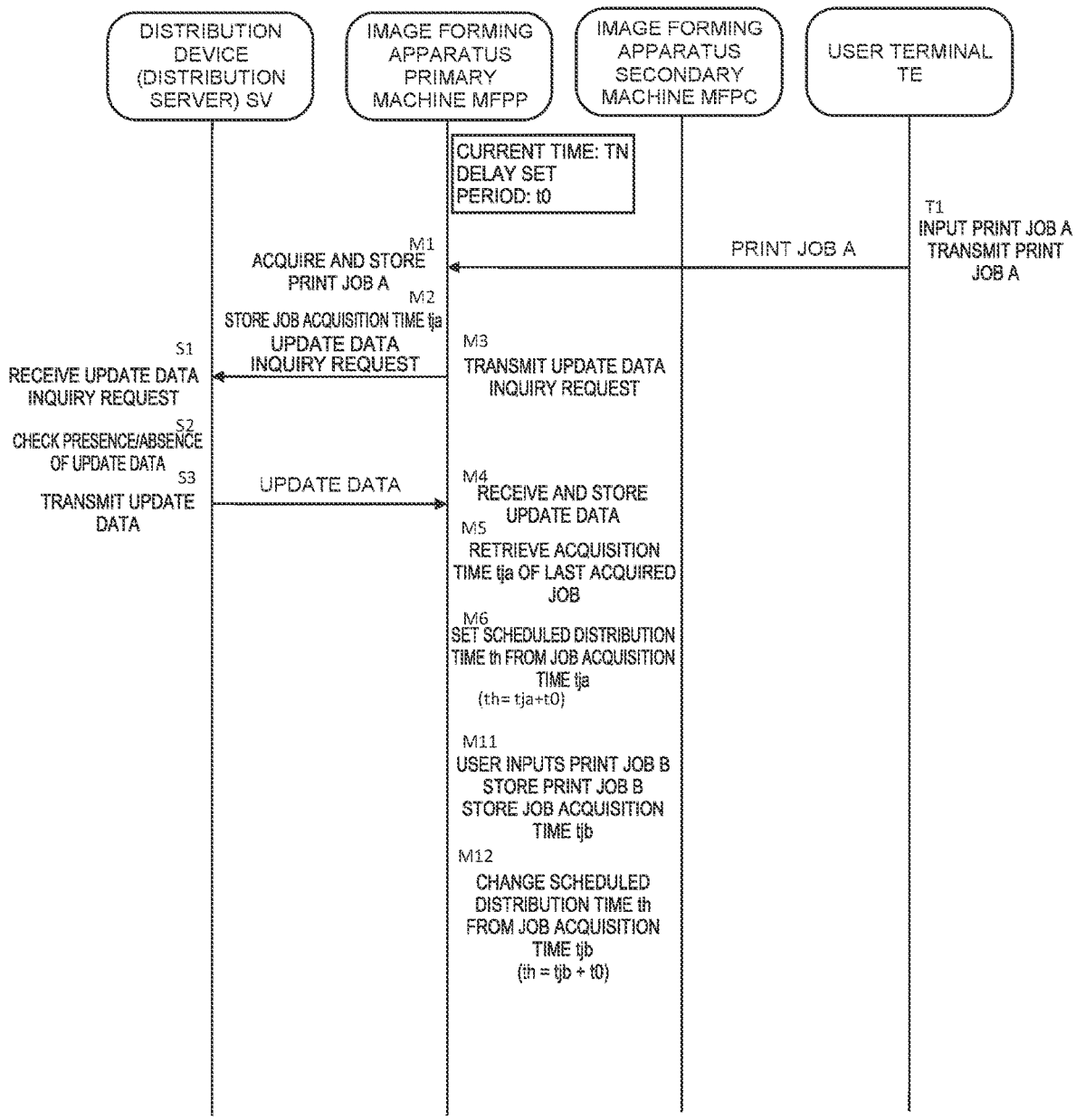
FIG. 8 illustrates a communication sequence in a second example of the control program update processing in the program update system according to the present disclosure.
Figure 9:
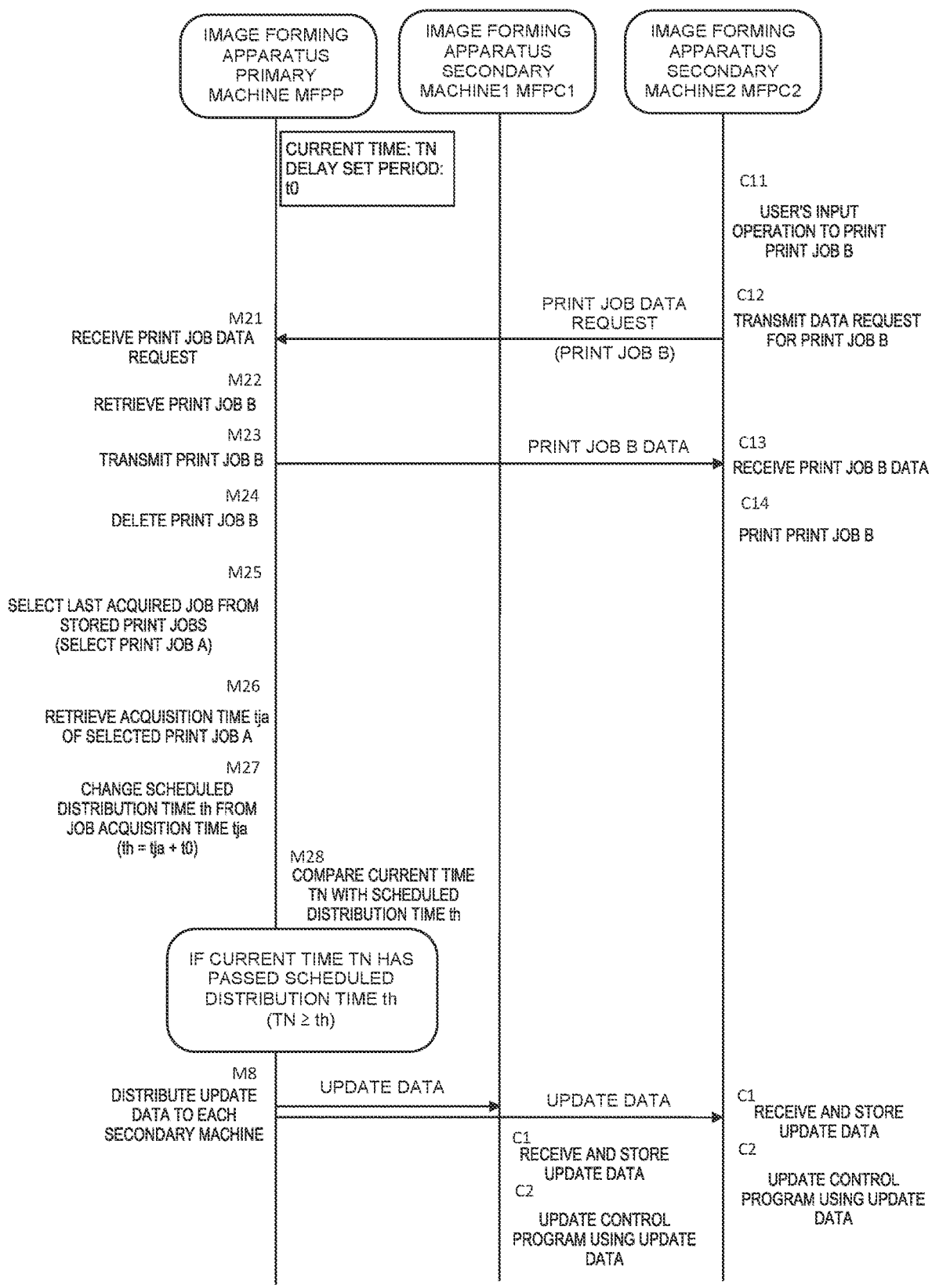
FIG. 9 illustrates a communication sequence in the second example of the control program update processing in the program update system according to the present disclosure.

FIG. 8 and FIG. 9 each illustrate a communication sequence in the second example of the control program update processing in the program update system.

In the communication sequence of the second example, each step in which the same processing is executed as that in the step of the communication sequence in FIG. 7 will be denoted by the same step number.

In FIG. 8, the same processing as that in the communication sequence illustrated in FIG. 7 is executed in each of step T1 of the user terminal TE, steps S1 to S3 of the distribution server SV, and steps M1 to M6 of the primary machine MFPP.

In other words, the user transmits a print job A input to the user terminal TE, the print job A is stored in the primary machine MFPP, and the update software query request is transmitted from the primary machine MFPP to the distribution server SV. Thereafter, the primary machine MFPP receives the update data transmitted from the distribution server SV, and sets the scheduled distribution time th to time that is acquired by adding the delay set period t0 stored in advance to job acquisition time tja (th=tja+t0) in consideration of time at which the print job A is acquired (the job acquisition time tja).

It is assumed that, after step M6 of the primary machine MFPP, in step M11, the user performs an input operation of a print job B on the user terminal B.

In this case, the primary machine MFPP stores the input print job B in the own storage 40.

In addition, the primary machine MFPP stores time at which the print job B is input as job acquisition time tjb.

Here, the job acquisition time tjb of the print job B is later than the job acquisition time tja of the print job A.

However, similar to step T1, the user may input the different print job B from the print job A on the user terminal TE.

In step M12, similar to step M6 described above, the primary machine MFPP changes the scheduled distribution time th by using the job acquisition time tjb of the print job B.

More specifically, the primary machine MFPP sets the scheduled distribution time th to time that is acquired by adding the delay set period t0 stored in advance to the job acquisition time tjb (th=tjb+t0).

In this way, the new print job B is stored, which postpones the scheduled distribution time th.

Next, it is assumed that, after step M12 in FIG. 8, in step C11 of the secondary machine MFPC2 illustrated in FIG. 9, the user performs an input operation to start printing the print job B (a print input operation) in order to print image data included in the print job B that has been input to the primary machine MFPP.

In step C12 of the secondary machine MFPC2, since the requested print job B is not stored in the secondary machine MFPC2, the secondary machine MFPC2 transmits a data request for the print job B (a print job data request) to the primary machine MFPP. The print job data request includes information on the requested print job B.

In step M21 of the primary machine MFPP, the primary machine MFPP receives the print job data request.

In step M22, the primary machine MFPP checks information on the print job B, which is included in the print job data request, and retrieves the print job B from the storage 40.

In step M23, the primary machine MFPP transmits the retrieved print job B to the secondary machine MFPC2 that has transmitted the print job data request. The transmitted print job B includes the image data as the print target.

In step C13 of the secondary machine MFPC2, the secondary machine MFPC2 receives the print job B including the image data.

In step C14, the secondary machine MFPC2 executes the printing processing of the print job B.

More specifically, the image output device in the image processor 54 prints the image data, which is included in the print job B, onto the specified printing paper.

In step M24 of the primary machine MFPP, the primary machine MFPP deletes the print job B, which is stored in the storage 40, after transmitting the print job B. Alternatively, although not illustrated, the primary machine MFPP may delete the print job B after receiving, from the secondary machine MFPC2, information indicating that printing of the print job B is completed.

In step M25, the primary machine MFPP selects the last acquired job from the print jobs that are stored in the storage 70 of the primary machine MFPP.

At a time point of step M11 in FIG. 8 described above, the last acquired job is the print job B. However, since the print job B is deleted in step M24, the print job A as the last acquired job is selected herein from the print jobs that are stored in the storage 40.

In step M26, the primary machine MFPP retrieves the job acquisition time tj of the selected print job A.

In step M27, similar to step M12 described above, the primary machine MFPP changes the scheduled distribution time th by using the retrieved job acquisition time tj a.

More specifically, the primary machine MFPP sets the scheduled distribution time th to the time that is acquired by adding the delay set period t0 stored in advance to the job acquisition time tja (th=tja+t0).

In this way, the scheduled distribution time th is updated to the time that takes into account the job acquisition time tja of the last acquired job among the print jobs that remain in the storage 70.

In step M28, similar to step M7, the primary machine MFPP compares the current time TN with the scheduled distribution time th.

If the current time TN matches the scheduled distribution time th or has passed the scheduled distribution time th (TN≥th), the processing proceeds to step M8.

On the other hand, if the current time TN has not passed the scheduled distribution time th (TN<th), that is, if the current time TN has not yet reached the scheduled distribution time th, the processing remains in step M28, and the primary machine MFPP periodically repeats the comparison between the current time TN and the scheduled distribution time th.

In step M8, if the current time TN has reached the scheduled distribution time th, the primary machine MFPP distributes the update data to all of the managing secondary machines (MFPC1, MFPC2 in FIG. 9).

In step C1 of the two secondary machines (MFPC1, MFPC2) in FIG. 9, each of the two secondary machines (MFPC1, MFPC2) receives and stores the update data.

Furthermore, in step C2 of the two secondary machines (MFPC1, MFPC2), the two secondary machines (MFPC1, MFPC2) each execute the update processing (updating) of the control program of the secondary machine MFPC by using the received update data.

The update processing may automatically be initiated as soon as the update data is received. However, the update processing is preferably executed after it is confirmed that the user is not operating the secondary machine MFPC and that any function of the secondary machine MFPC is not implemented.

As it has been described so far, the secondary machine MFPC requests the print job from the primary machine MFPP, and the print job is printed in the secondary machine MFPC. In such a case, when details of the print job stored in the primary machine MFPP are changed, the scheduled distribution time th is changed to the time that takes into account the job acquisition time tj of the last acquired job among the print jobs that remains in the storage 40 of the primary machine MFPP. Therefore, similar to the first example described above, it is possible to reduce the possible occurrence of the situation where the timing for executing the print job overlaps the timing for updating the control program in the secondary machine MFPC.

Control Program Update Processing: Third Example

A description will herein be made on an example of a case where the primary machine MFPP distributes the update data to each of the secondary machines MFPC as soon as storing the update data, and the secondary machine MFPC determines the timing for updating the control program by using the update data on the basis of the information acquired from the primary machine.

In the case where the primary machine MFPP stores the new print job after the primary machine MFPP distributes the update data to the secondary machine MFPC, the primary machine MFPP transmits the changed update time t2 described above to the secondary machine MFPC, and the secondary machine MFPC changes the scheduled update start time T by using the received changed update time t2.

For example, in the case where the print job acquirer 17 of the primary machine MFPP acquires the new print job, the job acquisition time setting device 21 sets and stores the second job acquisition time tj at which the new job has been acquired, the changed update time setting device 23 sets the changed update time t2 by using the second job acquisition time tj, the changed update time transmitter 24 transmits the set changed update time t2 to the secondary machine MFPC, and the scheduled update start time setting device 59 of the secondary machine MFPC updates the scheduled update start time T to the received changed update time t2.

In this way, the primary machine MFPP can distribute the update data to the secondary machine MFPC at appropriate timing.

In addition, even in the case where, when the primary machine MFPP stores the new print job, the timing for updating the control program is changed and the print input operation is performed to print the print job, it is possible to reduce the possible occurrence of the situation where the timing for executing the print job by the user's operation overlaps the timing for updating the control program in the secondary machine MFPC.

Figure 10:
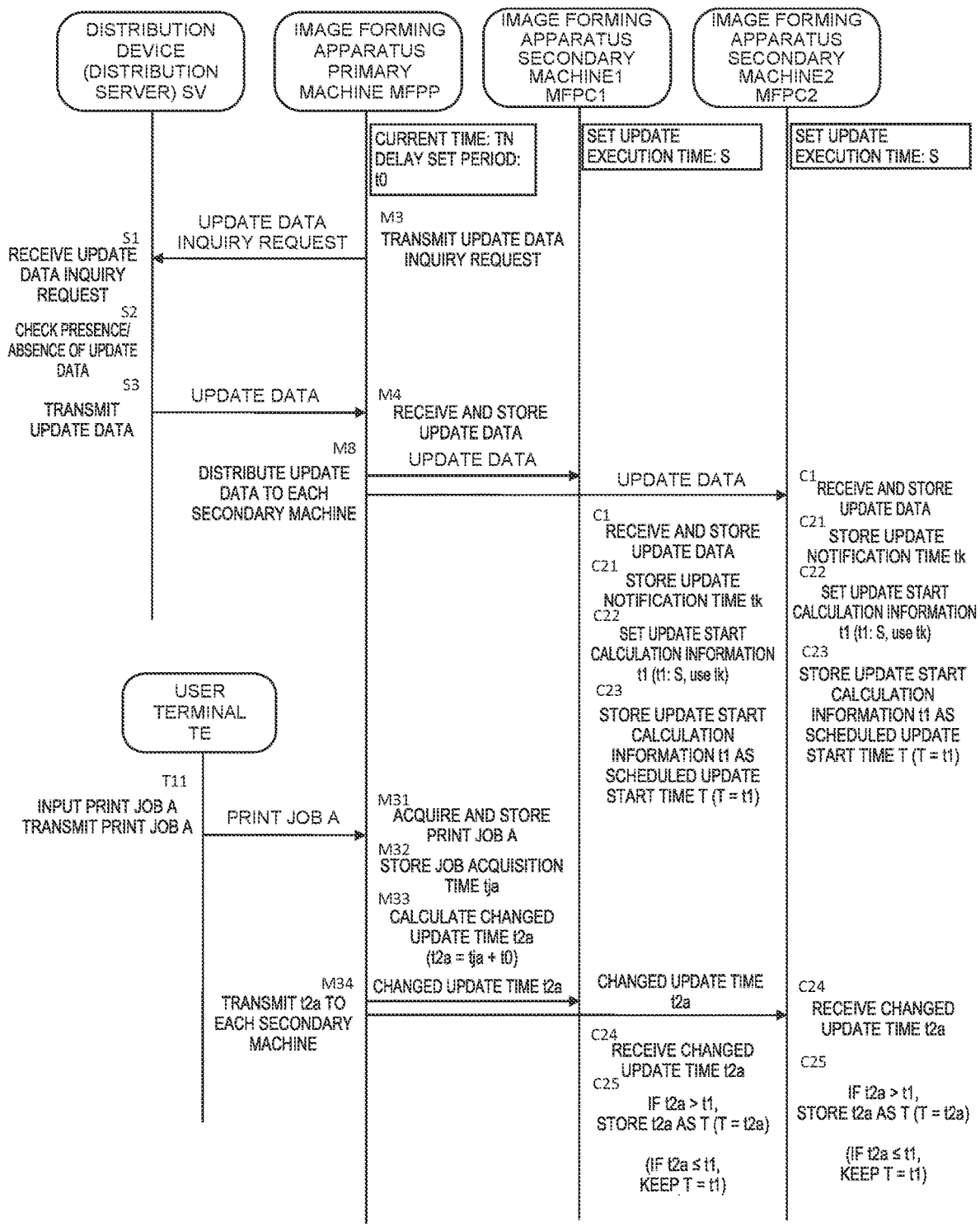
FIG. 10 illustrates a communication sequence in a third example of the control program update processing in the program update system according to the present disclosure.
Figure 11:
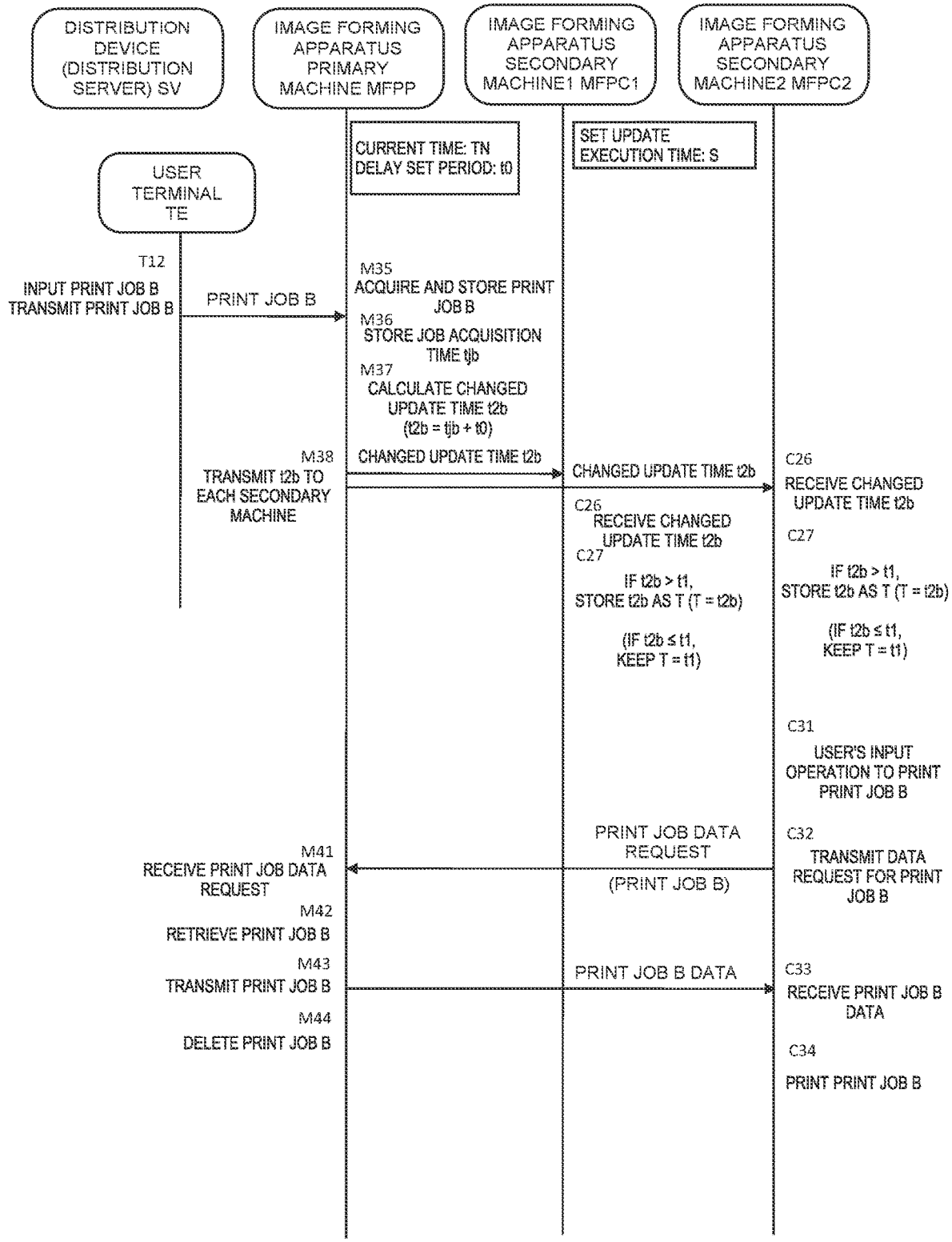
FIG. 11 illustrates a communication sequence in the third example of the control program update processing in the program update system according to the present disclosure.
Figure 12:
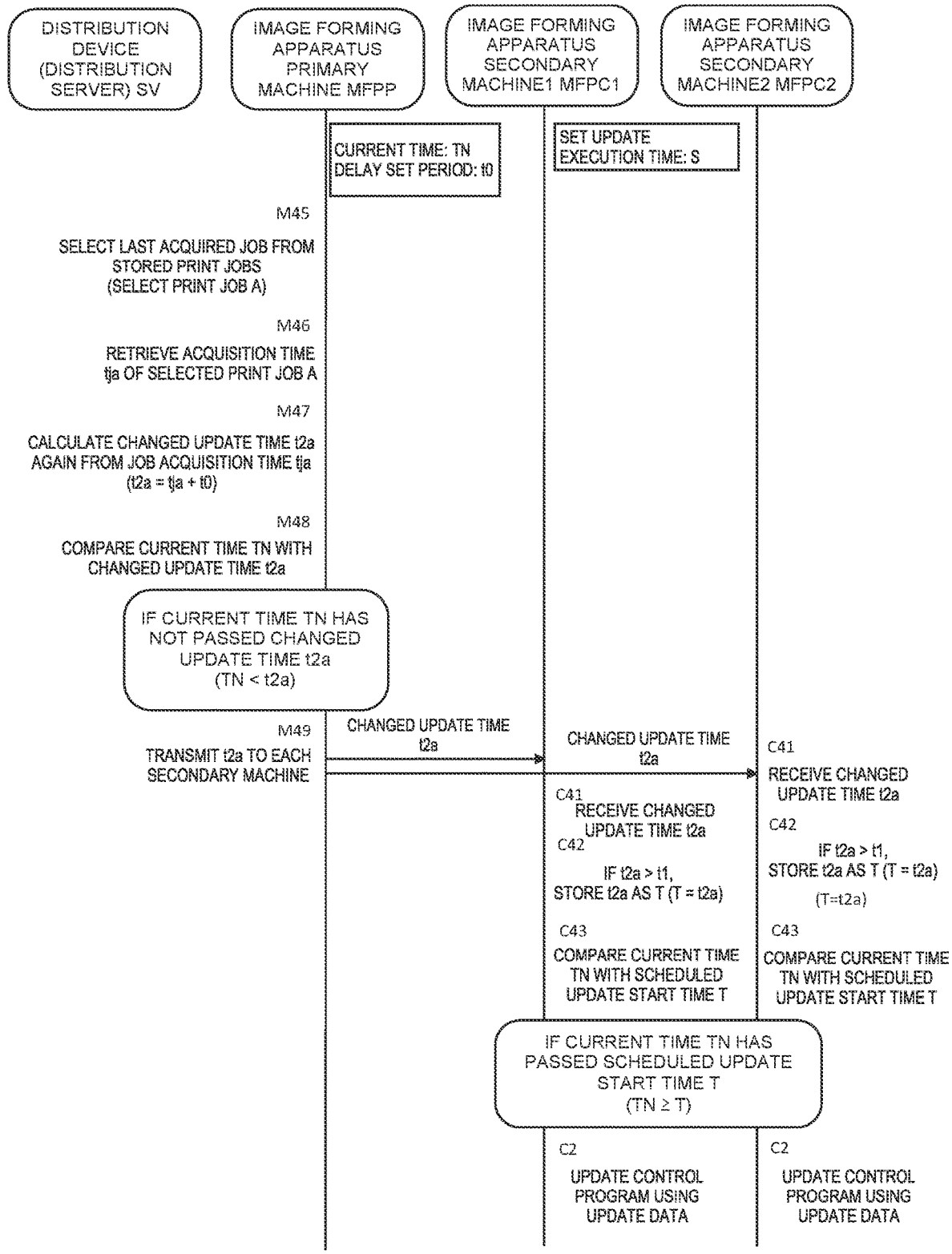
FIG. 12 illustrates a communication sequence in the third example of the control program update processing in the program update system according to the present disclosure.

FIG. 10, FIG. 11, and FIG. 12 each illustrate a communication sequence in a third example of the control program update processing in the program update system. Although the two secondary machines MFPC are illustrated, the number of the secondary machine MFPC may be three or more.

In the communication sequence of the third example, each step in which the same processing is executed as that in the step of the communication sequence in FIG. 7 will be denoted by the same step number.

It is assumed that the primary machine MFPP at least stores the delay set period t0 in advance. It is also assumed that the two secondary machines MFPC each store the set update execution time S in advance.

The set update execution time S may be the same for all of the secondary machines MFPC or may vary by each of the secondary machines MFPC.

In FIG. 10, the same processing as that in the communication sequence illustrated in FIG. 7 is executed in each of steps S1 to S3 of the distribution server SV, steps M3, M4, M8 of the primary machine MFPP, and step C1 of the secondary machine MFPC.

More specifically, after the primary machine MFPP transmits the update software query request to the distribution server SV in step M3 illustrated in FIG. 10, the primary machine MFPP transmits the update data to each of the secondary machines (MFPC1, MFPC2) as soon as the primary machine MFPP receives the update data transmitted from the distribution server SV.

When receiving the update data, the secondary machines (MFPC1, MFPC2) each store the update data in the storage 70 but do not execute the update processing yet.

In step C21, after storing the update data, each of the two secondary machines MFPC stores the update acquisition time tk, which is the time at which the update data is received, in the storage 70.

In step C22, each of the two secondary machines MFPC sets the update start calculation information t1.

Here, as described above, the update start calculation information t1 is set by using the set update execution time S, which is stored in the secondary machine MFPC in advance, and the update acquisition time tk.

In step C23, each of the two secondary machines MFPC stores the update start calculation information t1 as the scheduled update start time T (T=t1).

Here, the same time as the update start calculation information t1 is set as the scheduled update start time T.

Thereafter, in the case where there is no event such event that the print job is stored in the primary machine MFPP or that the printing processing of the print job is executed in the secondary machine MFPC, the update processing of the control program of the secondary machine MFPC is executed by using the update data when the current time TN passes the scheduled update start time T.

In FIG. 10, it is assumed that, after step C23, in step S11 of the user terminal TE, similar to step S1 in FIG. 7, the user inputs the created print job A and performs the operation to transmit the print job A to the primary machine MFPP, so as to print the print job.

The print job A includes the image data of the print target.

With this operation, the print job A is transmitted from the user terminal TE to the primary machine MFPP.

In step M31 of the primary machine MFPP, the primary machine MFPP acquires the print job A and stores the print job A as the print job information 43 in the storage 40.

In step M32, the primary machine MFPP stores the time at which the print job A is acquired as the job acquisition time tja. The job acquisition time tja is stored in association with the print job A.

In step M33, the primary machine MFPP calculates the changed update time t2a. As described above, the changed update time t2a is calculated by adding the delay set period t0 to the job acquisition time tja (t2a=tja+t0).

In step M34, the primary machine MFPP transmits the calculated changed update time t2a to each of the secondary machines MFPC.

In step C24 of the secondary machine MFPC, each of the secondary machines MFPC receives the changed update time t2a.

In step C25, each of the secondary machines MFPC compares the received changed update time t2a with the update start calculation information t1, which has been set in the secondary machine MFPC.

If the changed update time t2a is later than the update start calculation information t1 (t2a>t1), each of the secondary machines MFPC stores the changed update time t2a as the scheduled update start time T (T=t2a).

That is, each of the secondary machines MFPC changes the scheduled update start time T from the update start calculation information t1 to the later changed update time t2a.

On the other hand, if the changed update time t2a is the same as the update start calculation information t1 or is earlier than the update start calculation information t1 (t2a≤t1), the scheduled update start time T remains the same as the update start calculation information t1 (T=t1).

After step C25 in FIG. 10, the processing proceeds to the communication sequence in FIG. 11.

In FIG. 11, it is assumed that, in step S12 of the user terminal TE, similar to step S11, the user inputs the different print job B from the print job A and performs the operation to transmit the print job B to the primary machine MFPP, so as to print the print job.

With this operation, the print job B is transmitted from the user terminal TE to the primary machine MFPP.

In step M35 of the primary machine MFPP, the primary machine MFPP acquires the print job B and stores the print job B as the print job information 43 in the storage 40.

In step M36, the primary machine MFPP stores the time at which the print job B is acquired as the job acquisition time tjb.

The job acquisition time tjb is stored in association with the print job B.

The job acquisition time tjb is later than the job acquisition time tja described above (tjb>tja).

In step M37, the primary machine MFPP calculates the changed update time t2b. As described above, the changed update time t2b is calculated by adding the delay set period t0 to the job acquisition time tjb (t2b=tjb+t0).

In step M38, the primary machine MFPP transmits the calculated changed update time t2b to each of the secondary machines MFPC.

In step C26 of the secondary machine MFPC, each of the secondary machines MFPC receives the changed update time t2b.

In step C27, similar to step C25, each of the secondary machines MFPC compares the received changed update time t2b with the update start calculation information t1, which has been set in the secondary machine MFPC.

If the changed update time t2b is later than the update start calculation information t1 (t2b>t1), each of the secondary machines MFPC stores the changed update time t2b as the scheduled update start time T (T=t2b).

That is, each of the secondary machines MFPC changes the scheduled update start time T to the changed update time t2b that is later than the update start calculation information t1. On the other hand, if the changed update time t2b is the same as the update start calculation information t1 or is earlier than the update start calculation information t1 (t2b≤t1), the scheduled update start time T remains the same as the update start calculation information t1. However, if the changed update time t2b has already been registered as the scheduled update start time T, the scheduled update start time T remains as the changed update time t2b (T=t2b).

Next, it is assumed that, in step C31 of the secondary machine MFPC2, similar to step C11 in FIG. 9, the user performs the input operation to start printing the print job B (the print input operation) in order to print the image data included in the print job B that has been input to the primary machine MFPP.

In step C32 of the secondary machine MFPC2, similar to step C12, since the requested print job B is not stored in the secondary machine MFPC2, the secondary machine MFPC2 transmits the data request for the print job B (the print job data request) to the primary machine MFPP.

Hereafter, the same processing as that in steps M21 to M24 is executed in the primary machine MFPP.

More specifically, in step M41 of the primary machine MFPP, the primary machine MFPP receives the print job data request.

In step M42, the primary machine MFPP checks the information on the print job B, which is included in the print job data request, and retrieves the print job B from the storage 40.

In step M43, the primary machine MFPP transmits the retrieved print job B to the secondary machine MFPC2 that has transmitted the print job data request. The transmitted print job B includes the image data as the print target.

In step M44 of the primary machine MFPP, the primary machine MFPP deletes the print job B, which is stored in the storage 40, after transmitting the print job B.

In step C33 of the secondary machine MFPC2, similar to step C13, the secondary machine MFPC2 receives the print job B including the image data.

In step C34, similar to step C14, the secondary machine MFPC2 executes the printing processing of the print job B.

In the primary machine MFPP, after step M44 of the primary machine MFPP, processing proceeds to step M45 in FIG. 12.

In step M45, the primary machine MFPP selects the last acquired job from the print jobs that are stored in the storage 40 of the primary machine MFPP.

At the time point of step M35 in FIG. 11 described above, the last acquired job is the print job B. However, since the print job B is deleted in step M44, the print job A as the last acquired job is selected from the print jobs that are stored in the storage 40.

In step M46, the primary machine MFPP retrieves the job acquisition time tj of the selected print job A.

In step M47, the primary machine MFPP calculates the changed update time t2a from the job acquisition time tja again.

The changed update time t2a is calculated by adding the delay set period t0 to the job acquisition time tja (t2a=tja+t0).

In step M48, the primary machine MFPP compares the current time TN with the changed update time t2a.

If the current time TN has not passed the changed update time t2a (TN<t2a), the processing proceeds to step M49.

However, if the current time TN is the same as the changed update time t2a or has passed the changed update time t2a (TN≥t2a), the processing in step M49 is not executed.

In step M49, similar to step M34, the primary machine MFPP transmits the calculated changed update time t2a to each of the secondary machines MFPC.

In step C41 of each of the secondary machines MFPC, each of the secondary machines MFPC receives the changed update time t2a.

In step C42, each of the secondary machines MFPC compares the received changed update time t2a with the update start calculation information t1, which has been set in the secondary machine MFPC.

If the changed update time t2a is later than the update start calculation information t1 (t2a>t1), each of the secondary machines MFPC changes the scheduled update start time T to the changed update time t2a as (T=t2a).

On the other hand, if the changed update time t2a is the same as the update start calculation information t1 or is earlier than the update start calculation information t1 (t2a<t1), the scheduled update start time T is not changed.

In step C43, each of the secondary machines MFPC compares the current time TN with the scheduled update start time T.

If the current time TN is the same as the scheduled update start time T or has passed the scheduled update start time T (TN≥T), the processing proceeds to step C2.

If the current time TN has not passed the scheduled update start time T (TN<T), the processing in step C43 is periodically repeated until the current time TN reaches the scheduled update start time T.

In step C2 of each of the secondary machines (MFPC1, MFPC2), each of the secondary machines (MFPC1, MFPC2) executes the update processing (updating) of the control program of the secondary machine MFPC by using the update data that has already been received.

The update processing may automatically be initiated as soon as the update data is received. However, the update processing is preferably executed after it is confirmed that any function of the secondary machine MFPC is not implemented.

As it has been described so far, once the update data is stored in the primary machine MFPP, the update data is immediately transmitted to each of the secondary machines MFPC. However, each time the print job is stored in the primary machine MFPP, the changed update time t2, which is calculated by using the job acquisition time tj of such a print job, is transmitted to each of the secondary machines MFPC, and the scheduled update start time T is postponed to the time that takes into consideration the job acquisition time tj. Therefore, similar to the examples described above, it is possible to reduce the occurrence of such a situation where the timing for executing the print job overlaps the timing for updating the control program in the secondary machine MFPC.

Furthermore, the secondary machine MFPC requests the print job from the primary machine MFPP, and the print job is printed in the secondary machine MFPC. In such a case, when the details of the print job stored in the primary machine MFPP are changed, the scheduled update start time T is changed to the time that takes into account the job acquisition time tj of the last acquired job among the print jobs that remains in the storage 40 of the primary machine MFPP. Therefore, similarly, it is possible to reduce the possible occurrence of a situation where the timing for updating the control program is delayed unnecessarily in the secondary machine MFPC.

Control Program Update Processing: Fourth Example

A description will herein be made on an example in which the secondary machine MFPC manages timing to request the acquisition of the update data from the primary machine MFPP, which receives the update data acquisition request, and the primary machine MFPP determines whether to distribute the update data according to a print job reception status.

For example, in the case where the primary machine MFPP stores the new update data, does not automatically distribute the update data to each of the secondary machines MFPC, and receives the update data acquisition request from the secondary machine MFPC, the primary machine MFPP transmits the stored update data to the secondary machine MFPC that has transmitted the acquisition request.

Here, in the case where the print job is stored in the primary machine MFPP, the scheduled distribution time is set in consideration of time at which the print job is stored (the job acquisition time). Then, in the case where the current time has passed the scheduled distribution time, the update data is transmitted to the secondary machine MFPC. On the other hand, in the case where the current time has not passed the scheduled distribution time, the update data is not transmitted to the secondary machine MFPC.

In other words, in the case where the predetermined period has not elapsed from the time at which the print job is stored (the job acquisition time), the user is likely to perform the print job by operating the secondary machine MFPC. Thus, even when the update data acquisition request is received from the secondary machine MFPC, the update data is not transmitted to the secondary machine MFPC.

Furthermore, in the case where the update data is not transmitted to the secondary machine MFPC, the transmission timing at which the secondary machine MFPC transmits the update data acquisition request to the primary machine MFPP, is reset.

In this way, since the primary machine MFPP manages timing at which the update data can be distributed, the secondary machine MFPC does not have to confirm the presence of the print job that is stored in the primary machine MFPP, and can request for the distribution of the update data at appropriate timing.

In addition, in the case where the primary machine MFPP stores the new print job, the primary machine MFPP resets the update data distribution timing in consideration of the time at which the job is acquired. Thus, in the secondary machine MFPC, it is possible to reduce possible occurrence of a situation where timing for the user's print input operation on the secondary machine MFPC overlaps the timing for updating the control program.

FIG. 13 to FIG. 16 each illustrate a communication sequence in a fourth example of the control program update processing in the program update system.

Although the two secondary machines MFPC are illustrated, the number of the secondary machine MFPC may be three or more.

In the communication sequence of the fourth example, each step in which the same processing is executed as that in the step of the communication sequence in FIG. 7 will be denoted by the same step number.

It is assumed that the primary machine MFPP at least stores the delay set period t0 in advance. In addition, while the scheduled distribution time is denoted by "th" in the first example illustrated in FIG. 2 and FIG. 7, in this example, the scheduled distribution time will be denoted by "th2".

For example, the scheduled distribution time that is set in association with the print job A will be denoted by "th2a".

It is also assumed that the two secondary machines MFPC each store, in advance, the set update execution time S, the default value of the scheduled update start time T, and the restart interval information tR.

Each of the set update execution time S, the default value of the scheduled update start time T, and the restart interval information tR may be the same for all of the secondary machines MFPC or may vary by each of the secondary machines MFPC.

Here, the default value of the scheduled update start time T may be the current time TN at the time when the secondary machine MFPC is activated, or may be calculated from the set update execution time S and the current time TN.

For example, in the case where the set update execution time S is 03:00, and the current time TN upon the activation is Sep. 24, 2021, 16:00, Sep. 25, 2021, 3:00 is set as the default value of the scheduled update start time T.

Figure 13:
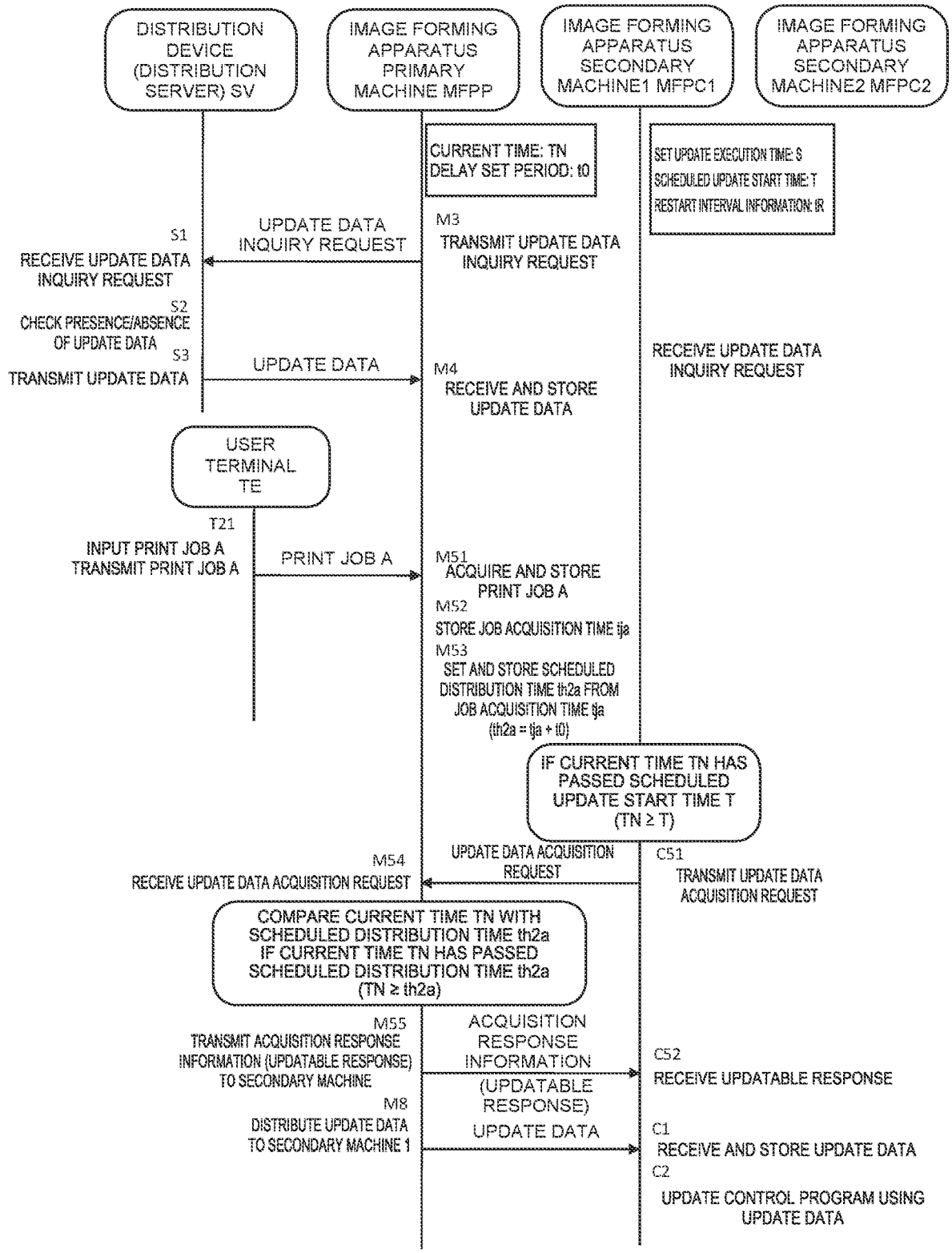
FIG. 13 illustrates a communication sequence in a fourth example of the control program update processing in the program update system according to the present disclosure.

The communication sequence in FIG. 13 illustrates an example of the update processing in the case where, in the primary machine MFPP, the current time TN, at which the update data acquisition request is received from the secondary machine MFPC, passes the scheduled distribution time th2 that is set in consideration of the time at which the print job is stored (the job acquisition time tj).

Figure 14:
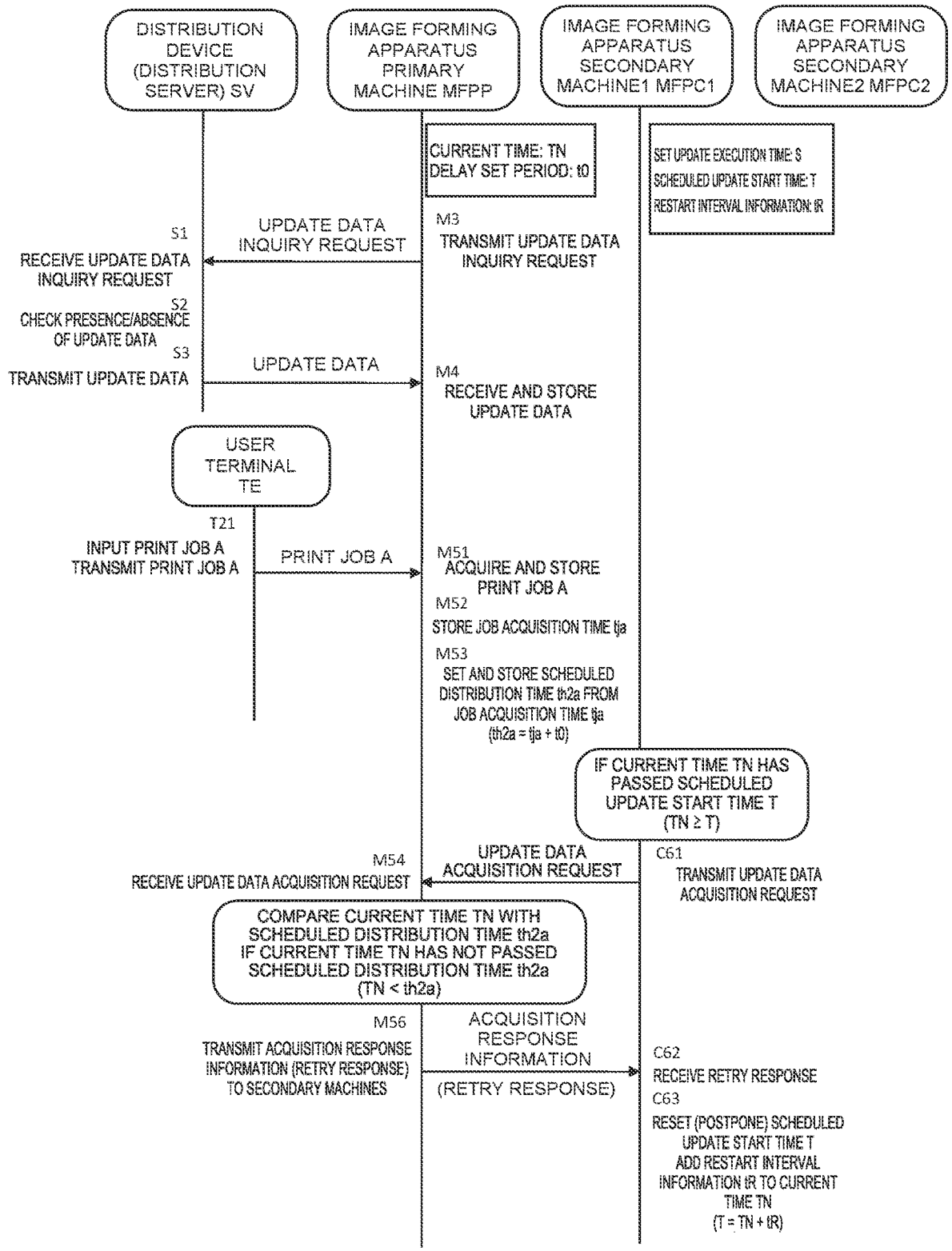
FIG. 14 illustrates a communication sequence in the fourth example of the control program update processing in the program update system according to the present disclosure.
Figure 15:
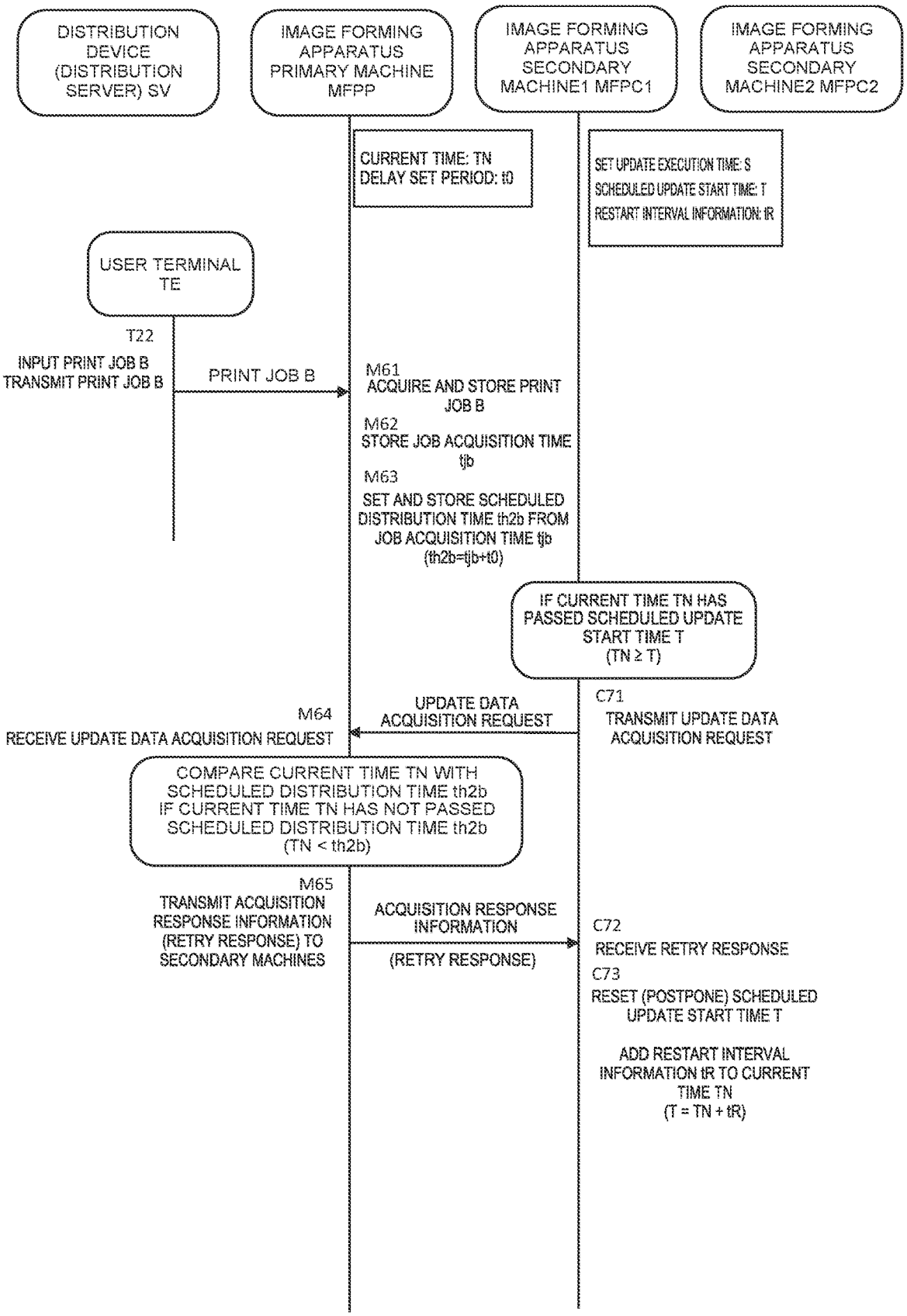
FIG. 15 illustrates a communication sequence in the fourth example of the control program update processing in the program update system according to the present disclosure.
Figure 16:
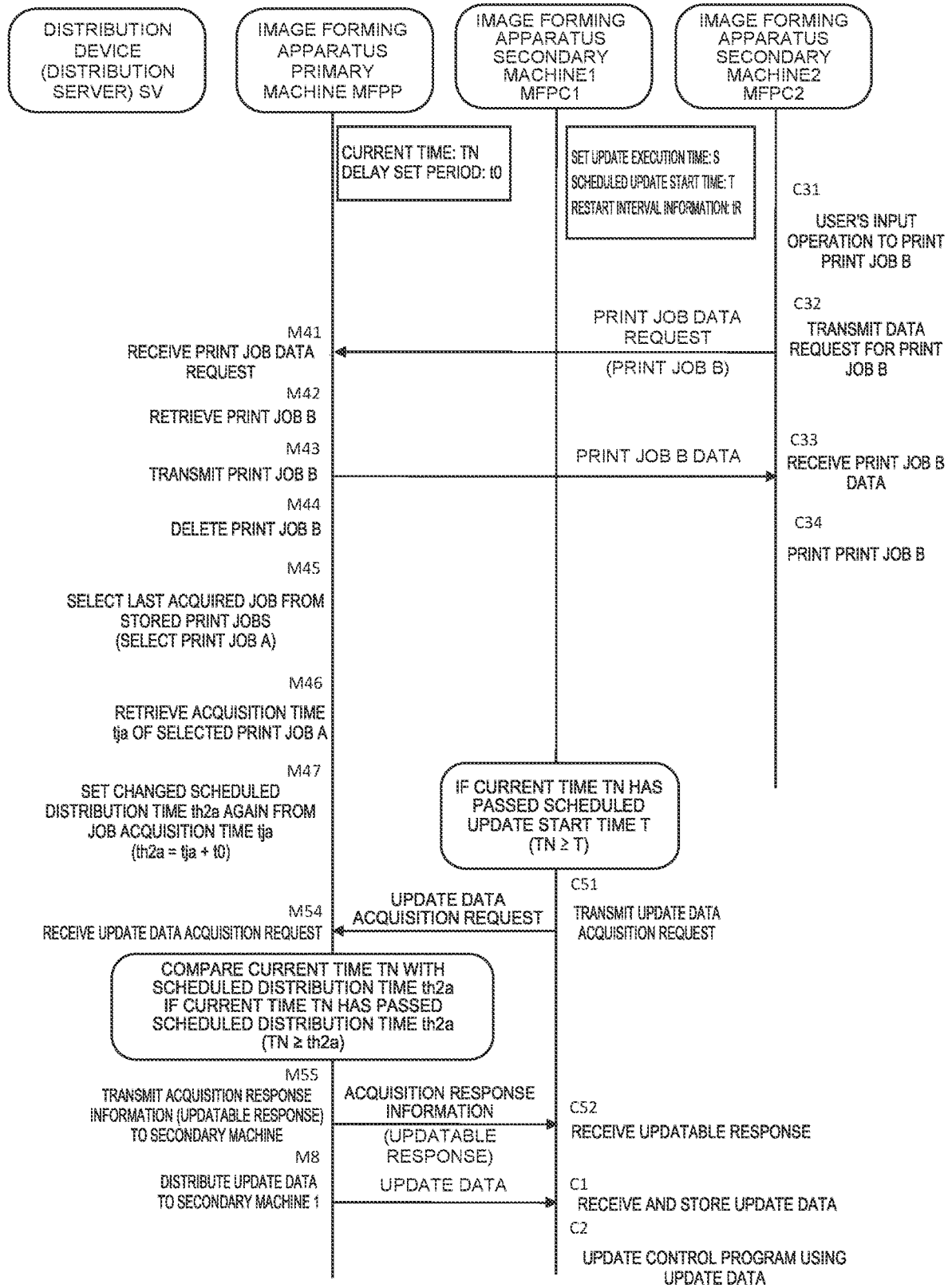
FIG. 16 illustrates a communication sequence in the fourth example of the control program update processing in the program update system according to the present disclosure.

Meanwhile, each of the communication sequences in FIGS. 14, 15, 16 illustrates an example of the update processing including a case where, in the primary machine MFPP, the current time TN, at which the update data acquisition request is received from the secondary machine MFPC, has not passed the scheduled distribution time th2, which is set in consideration of the time at which the print job is stored (the job acquisition time tj).

Description of Communication Sequence in FIG. 13

In FIG. 13, the same processing as that in the communication sequence illustrated in FIG. 7 is executed in each of steps S1 to S3 of the distribution server SV and steps M3, M4 of the primary machine MFPP.

More specifically, after the primary machine MFPP transmits the update software query request to the distribution server SV in step M3 illustrated in FIG. 13, the distribution server SV transmits the update data in step S3, and the primary machine MFPP receives and stores the update data transmitted from the distribution server SV in step M4.

At a time point at which the update data is received, the primary machine MFPP does not yet transmit the update data to the secondary machines (MFPC1, MFPC2).

In step T21 of the user terminal TE in FIG. 13, similar to step S1 in FIG. 7, it is assumed that the user inputs the created print job A and performs the operation to transmit the print job A to the primary machine MFPP, so as to print the print job.

The print job A includes the image data of the print target.

With this operation, the print job A is transmitted from the user terminal TE to the primary machine MFPP.

In step M51 of the primary machine MFPP, the primary machine MFPP acquires the print job A and stores the print job A as the print job information 43 in the storage 40.

In step M52, the primary machine MFPP stores the time at which the print job A is acquired as the job acquisition time tj a. The job acquisition time tja is stored in association with the print job A.

In step M53, the primary machine MFPP calculates the changed update time t2a. The scheduled distribution time th2a is calculated by adding the delay set period t0 to the job acquisition time tja (th2a=tja+t0).

In step C51 of the secondary machine MFPC1, if the current time TN has passed the scheduled update start time T, which is set in advance (TN≥T), the secondary machine MFPC1 transmits the update data acquisition request to the primary machine MFPP.

In step M54 of the primary machine MFPP, the primary machine MFPP receives the update data acquisition request.

In the primary machine MFPP, the current time TN is compared with the scheduled distribution time th2a.

If the current time TN has passed the scheduled distribution time th2a (TN≥th2a), the processing proceeds to step M55. Also, if the current time TN matches the scheduled distribution time th2a, the processing proceeds to step M55.

Hereinafter, the case where the current time TN has passed the scheduled distribution time th2 also includes the case where the current time TN matches the scheduled distribution time th2a.

In the case where the current time TN has passed the scheduled distribution time th2a, the delay set period t0 has already elapsed from the time at which the print job A is acquired (the job acquisition time tja). Thus, it is determined that the update data can be distributed.

On the other hand, if the current time TN has not passed the scheduled distribution time th2a, in order to avoid an overlap between the timing for updating the control program and the timing for executing the print job, as illustrated in the communication sequence of FIG. 14, which will be described below, the primary machine MFPP transmits the acquisition response information (the retry response) to the secondary machine MFPC1 without distributing the update data. This case will be described in the communication sequence illustrated in FIG. 14, which will be described below.

In step M55 of the primary machine MFPP, the primary machine MFPP generates the acquisition response information (the updatable response) as the response to the update data acquisition request, and transmits the acquisition response information (the updatable response) to the secondary machine MFPC1.

In step C52 of the secondary machine MFPC1, the secondary machine MFPC1 receives the acquisition response information (the updatable response).

Here, the update data itself may be included in the acquisition response information (the updatable response) that is transmitted from the primary machine MFPP to the secondary machine MFPC1.

In the case where the update data is included in the acquisition response information (the updatable response), following step M8 can be omitted.

Thereafter, similar to FIG. 7, step M8 of the primary machine MFPP and steps C1, C2 of the secondary machine MFPC1 are executed.

In step M8, the primary machine MFPP distributes the update data to the secondary machine MFPC1 that has transmitted the update data acquisition request.

In step C1 of the secondary machine MFPC1, the secondary machine MFPC1 receives and stores the update data.

In step C2, the secondary machine MFPC1 executes the update processing (updating) of the control program of the secondary machine MFPC1 by using the received update data.

The update processing may automatically be initiated as soon as the update data is received. However, the update processing is preferably executed after it is confirmed that any function of the secondary machine MFPC is not implemented.

Unlike FIG. 13, in the case where the primary machine MFPP receives the update data acquisition request in a state where the new update data is not stored in the primary machine MFPP, due to the absence of the new update data, in step M55 of the primary machine MFPP, the primary machine MFPP generates the acquisition response information (the response without the update data) as the response to the update data acquisition request, and transmits the acquisition response information (the response without the update data) to the secondary machine MFPC1.

In this case, the secondary machine MFPC1, which has received "RESPONSE WITHOUT UPDATE DATA" sets the scheduled update start time T to the set update execution time S on the next day, for example. Thereafter, when the postponed the scheduled update start time T arrives, the secondary machine MFPC1 only needs to transmit the update data acquisition request again.

As it has been described so far, in this example, regardless of whether the primary machine MFPP stores the print job, in the case where the predetermined time (the scheduled update start time T) passes in the secondary machine MFPC, the secondary machine MFPC transmits the update data acquisition request to the primary machine MFPP.

In addition, in the case where the primary machine MFPP stores the print job, and the current time TN has passed the scheduled distribution time th2a when the primary machine MFPP receives the update data acquisition request from the secondary machine MFPC, it is considered that, even when the primary machine MFPP transmits the update data to the secondary machine MFPC, such a situation is less likely to occur where the processing of such a print job is delayed. Thus, the secondary machine MFPC transmits the update data to the secondary machine MFPC.

Description of Communication Sequence in FIG. 14 to FIG. 16

In FIG. 14, the same processing as that in the communication sequence illustrated in FIG. 13 is executed as processing in each of steps S1 to S3 of the distribution server SV, steps M3, M4 of the primary machine MFPP, step T21 of the user terminal TE, and steps M51 to M53 of the primary machine MFPP.

More specifically, in FIG. 14, after the primary machine MFPP transmits the update software query request to the distribution server SV, the distribution server SV transmits the update data, and the primary machine MFPP receives and stores the update data transmitted from the distribution server SV Thereafter, in step T21 of the user terminal TE, in the case where the user inputs the created print job A and performs the operation to transmit the print job A to the primary machine MFPP, so as to print the print job, the user terminal TE transmits the print job A to the primary machine MFPP, and the primary machine MFPP acquires the print job A, stores the time at which the print job A is acquired as the job acquisition time tj a, and sets the scheduled distribution time th2a (th2a=tja+t0).

In step C61 of the secondary machine MFPC1 in FIG. 14, similar to step C51 in FIG. 13, in the case where the current time TN has passed the scheduled update start time T, which is set in advance (TN≥T), the secondary machine MFPC1 transmits the update data acquisition request to the primary machine MFPP.

In step M54 of the primary machine MFPP, the primary machine MFPP receives the update data acquisition request.

In the primary machine MFPP, the current time TN is compared with the scheduled distribution time th2a.

If the current time TN has not passed the scheduled distribution time th2a (TN<th2a), the processing proceeds to step M56.

In step M56 of the primary machine MFPP, the primary machine MFPP generates the acquisition response information (the retry response) as the response to the update data acquisition request, and transmits the acquisition response information (the retry response) to the secondary machine MFPC1.

In step C62 of the secondary machine MFPC1, the secondary machine MFPC1 receives the acquisition response information (the retry response).

When the secondary machine MFPC1 receives the retry response, the update data has not yet been transmitted from the primary machine MFPP. Thus, the secondary machine MFPC1 postpones the scheduled update start time T and resets time at which the update data acquisition request is transmitted again.

Here, time at which the scheduled update start time T is postponed is set to the time at which the update data acquisition request is transmitted again.

In step C63, the secondary machine MFPC1 resets (postpones) the scheduled update start time T.

For example, the secondary machine MFPC1 sets the scheduled update start time T to time that is acquired by adding the restart interval information tR to the current time TN, at which the retry response is received (T=TN+tR).

Thereafter, the processing proceeds to the communication sequence in FIG. 15.

In step T22 of the user terminal TE in FIG. 15, similar to step T21 in FIG. 13 and FIG. 14, it is assumed that the user inputs the created print job B and performs the operation to transmit the print job B to the primary machine MFPP, so as to print the print job.

The print job B includes the image data of the different print target from the print job A, which has been input in step T21.

With this operation, the print job B is transmitted from the user terminal TE to the primary machine MFPP.

The same processing as that in steps M51, M52, M53 illustrated in FIG. 14 is respectively executed in steps M61, M62, M63 of the primary machine MFPP.

In step M61 of the primary machine MFPP, the primary machine MFPP acquires the print job B and stores the print job B as the print job information 43 in the storage 40.

In step M62, the primary machine MFPP stores the time at which the print job B is acquired as the job acquisition time tjb. The job acquisition time tjb is stored in association with the print job B.

In step M63, the primary machine MFPP sets the scheduled distribution time th2b. The scheduled distribution time th2b is calculated by adding the delay set period t0 to the job acquisition time tjb (th2b=tjb+t0).

In step C71 of the secondary machine MFPC1, if the current time TN has passed the scheduled update start time T, which is set in advance (TN≥T), the secondary machine MFPC1 transmits the update data acquisition request to the primary machine MFPP.

In step M64 of the primary machine MFPP, the primary machine MFPP receives the update data acquisition request.

In the primary machine MFPP, the current time TN is compared with the scheduled distribution time th2b.

If the current time TN has not passed the scheduled distribution time th2b (TN<th2b), the processing proceeds to step M65.

In step M65 of the primary machine MFPP, similar to step M56 described above, the primary machine MFPP generates the acquisition response information (the retry response) as the response to the update data acquisition request, and transmits the acquisition response information (the retry response) to the secondary machine MFPC1.

In step C72 of the secondary machine MFPC1, the secondary machine MFPC1 receives the acquisition response information (the retry response).

When the secondary machine MFPC1 receives the retry response, the update data has not yet been transmitted from the primary machine MFPP. Thus, the secondary machine MFPC1 postpones the scheduled update start time T and resets the time at which the update data acquisition request is transmitted again.

In step C73, similar to step C63 described above, the secondary machine MFPC1 resets (postpones) the scheduled update start time T.

For example, the secondary machine MFPC1 sets the scheduled update start time T to the time that is acquired by adding the restart interval information tR to the current time TN, at which the retry response is received (T=TN+tR).

Thereafter, the processing proceeds to the communication sequence in FIG. 16.

In the communication sequence illustrated in FIG. 16, processing in steps C31 to C34 of the secondary machine MFPC2 is the same as the processing illustrated in FIG. 9, and processing in steps M41 to M47 of the primary machine MFPP is the same as the processing illustrated in FIG. 11 and FIG. 12.

More specifically, it is assumed that, in step C31 of the secondary machine MFPC2 illustrated in FIG. 16, similar to step C11 in FIG. 9, the user performs the input operation to start printing the print job B (the print input operation) in order to print the image data included in the print job B that has been input to the primary machine MFPP.

In step C32 of the secondary machine MFPC2, since the requested print job B is not stored in the secondary machine MFPC2, the secondary machine MFPC2 transmits the data request for the print job B (the print job data request) to the primary machine MFPP.

In step M41 of the primary machine MFPP, the primary machine MFPP receives the print job data request.

In step M42, the primary machine MFPP checks the information on the print job B, which is included in the print job data request, and retrieves the print job B from the storage 40.

In step M43, the primary machine MFPP transmits the retrieved print job B to the secondary machine MFPC2 that has transmitted the print job data request. The transmitted print job B includes the image data as the print target.

In step M44 of the primary machine MFPP, the primary machine MFPP deletes the print job B, which is stored in the storage 40, after transmitting the print job B.

In step C33 of the secondary machine MFPC2, the secondary machine MFPC2 receives the print job B including the image data.

In step C34, the secondary machine MFPC2 executes the printing processing of the print job B.

In step M45, the primary machine MFPP selects the last acquired job from the print jobs that are stored in the storage 40 of the primary machine MFPP.

At the time point of step M61 in FIG. 15 described above, the last acquired job is the print job B. However, since the print job B is deleted in step M44, the print job A as the last acquired job is selected from the print jobs that are stored in the storage 40.

In step M46, the primary machine MFPP retrieves the job acquisition time tj of the selected print job A.

In step M47, the primary machine MFPP calculates the scheduled distribution time th2a from the job acquisition time tja again.

The scheduled distribution time th2a is calculated by adding the delay set period t0 to the job acquisition time tja (th2a=tja+t0).

Thereafter, the same processing as that in each of steps C51, C52, C1, C2 of the secondary machine MFPC1 and steps M54, M55, M8 of the primary machine MFPP illustrated in FIG. 13 is executed.

In step C51 of the secondary machine MFPC1, if the current time TN has passed the scheduled update start time T, which is set in advance (TN≥T), the secondary machine MFPC1 transmits the update data acquisition request to the primary machine MFPP.

In step M54 of the primary machine MFPP, the primary machine MFPP receives the update data acquisition request.

In the primary machine MFPP, the current time TN is compared with the scheduled distribution time th2a.

If the current time TN has passed the scheduled distribution time th2a (TN≥th2a), the processing proceeds to step M55.

In the case where the current time TN has passed the scheduled distribution time th2a, the delay set period t0 has already elapsed from the time at which the print job A is acquired (the job acquisition time tja). Thus, it is determined that the update data can be distributed.

In step M55 of the primary machine MFPP, the primary machine MFPP generates the acquisition response information (the updatable response) as the response to the update data acquisition request, and transmits the acquisition response information (the updatable response) to the secondary machine MFPC1.

In step C52 of the secondary machine MFPC1, the secondary machine MFPC1 receives the acquisition response information (the updatable response).

Here, the update data itself may be included in the acquisition response information (the updatable response) that is transmitted from the primary machine MFPP to the secondary machine MFPC1.

Thereafter, in step M8 of the primary machine MFPP, the primary machine MFPP distributes the update data to the secondary machine MFPC1 that has transmitted the update data acquisition request.

In step C1 of the secondary machine MFPC1, the secondary machine MFPC1 receives and stores the update data.

In step C2, the secondary machine MFPC1 executes the update processing (updating) of the control program of the secondary machine MFPC1 by using the received update data.

The update processing may automatically be initiated as soon as the update data is received. However, the update processing is preferably executed after it is confirmed that any function of the secondary machine MFPC is not implemented.

As it has been described so far, also, in this example from FIG. 14 to FIG. 16, regardless of whether the primary machine MFPP stores the print job, in the case where the predetermined time (the scheduled update start time T) passes in the secondary machine MFPC, the secondary machine MFPC transmits the update data acquisition request to the primary machine MFPP.

In addition, in the case where the primary machine MFPP stores the print job when receiving the update data acquisition request from the secondary machine MFPC, and the current time TN has not passed the scheduled distribution time th2, it is considered that the processing of the print job is highly likely to be executed. Thus, the update data is not distributed immediately. In this way, it is possible to reduce the occurrence of such a situation where the timing for executing the print job overlaps the timing for updating the control program in the secondary machine MFPC.

What is claimed is:

1. A program update system comprising a plurality of information processing apparatuses that is connected via a network, wherein;
    the plurality of information processing apparatuses includes at least one primary machine and at least one secondary machine,
    the at least one primary machine includes at least one first controller configured to:
        acquire job data including data to be processed in the at least one secondary machine,
        manage and store the acquired job data in a job data management storage,
        transmit the job data to the at least one secondary machine via the network, the job data being retrieved from the job data management storage in response to receiving a request from the at least one secondary machine,
        acquire update data for updating a first control program that controls an operation of the information processing apparatus,
        store the acquired update data in a first update data storage,
        distribute the update data retrieved from the first update data storage to the at least one secondary machine via the network,
        determine a scheduled distribution time of the update data, and
        store, in a first setting storage, a delay set period to provide a period in which the update data is not transmitted after the job data is received,
    the at least one secondary machine includes at least one second controller configured to:
        request a transmission of the job data from the at least one primary machine via the network,
        receive the job data transmitted from the at least one primary machine,
        implement a function provided to the at least one secondary machine by processing the received job data, store a second control program, controlling the second controller's own operation, in a program storage, receive the update data from the at least one primary machine via the network, and update the second control program stored in the program storage by using the received update data, wherein:

the delay set period is set based on a period from a time at which the job data is stored at the job data management storage of the at least one primary machine to a time at which the at least one secondary machine starts a job regarding the job data, or to a time at which the job is completed, and the at least one first controller is further configured to:
determine the scheduled distribution time as the delay set period after a time at which a last one of the job data stored in the job data management storage is acquired, and distribute the update data to the at least one secondary machine at the determined scheduled distribution time.

2. The program update system according to claim 1, wherein the at least one first controller is further configured to implement a function provided to the at least one primary machine in a similar manner to the function provided to the at least one secondary machine by processing the job data that is retrieved from the job data management storage.

3. The program update system according to claim 1, wherein the at least one primary machine further includes:
a first storage that stores the scheduled distribution time, and the at least one first controller is configured to distribute the update data at a time that is based on the scheduled distribution time.

4. The program update system according to claim 3, wherein in the at least one primary machine;

in a case that new job data is acquired after the scheduled distribution time is stored in the storage, the at least one first controller is further configured to change the scheduled distribution time based on a time at which the new job data is acquired.

5. The program update system according to claim 3, wherein in the at least one primary machine:

in a case that the at least one first controller is configured to acquire at least one piece of the job data, a job acquisition time as a time at which each piece of the job data is acquired is stored in the job data management storage in association with the piece of the job data, in a case that, after the storage stores the scheduled distribution time, a piece of the job data, which is retrieved from the job data management storage in response to the request received from the at least one secondary machine, is transmitted to the at least one secondary machine via the network, and the at least one first controller is further configured to change the scheduled distribution time by using the job acquisition time of another piece of job data that is other than the piece of job data transmitted to the at least one secondary machine and is stored in the job data management storage.

6. The program update system according to claim 1, wherein the at least one second controller is further configured to:

store the received update data in a second update data storage of the at least one secondary machine, set a scheduled update start time based on a time at which the update data is received, the scheduled update start time being a time at which the second control program starts to update, store the scheduled update start time in a second storage of the at least one secondary machine, change the scheduled update start time in response to storing new job data in the job data management storage by the at least one primary machine, and update the second control program at a time that is based on the scheduled update start time.

7. The program update system according to claim 6, wherein the at least one secondary machine further includes a second setting storage that stores an update start time setting, the update start time setting being a setting related to a time at which the second control program of the secondary machine starts to update, and the at least one second controller is further configured to use the update start time setting, which is stored in advance, when setting the scheduled update start time.

8. The program update system according to claim 6, wherein;

the at least one at least one first controller is further configured to transmit update control information to the at least one secondary machine in a case that a job is acquired and the job data is transmitted to the at least one secondary machine via the network, the update control information being information used to determine a scheduled time at which the at least one secondary machine executes control program update processing, in a case that a new job is acquired, the at least one first controller is configured to transmit the update control information to the at least one secondary machine, and the at least one second controller is further configured to update the scheduled update start time based on the received update control information.

9. The program update system according to claim 1, wherein:

the at least one first controller is further configured to:
receive an update data acquisition request transmitted from the at least one secondary machine, and determine whether to distribute the update data according to the job data stored in the job data management storage in a case that the update data acquisition request is received from the at least one secondary machine, and the at least one second controller is further configured to:
transmit the update data acquisition request to the at least one primary machine, the update data acquisition request being a request to acquire the update data.

10. The program update system according to claim 9, wherein;

the at least one secondary machine further includes a second setting storage that stores an update request time setting, the update request time setting being a setting related to a time at which the update data acquisition request is transmitted to the at least one primary machine, and the at least one second controller is configured to transmit the update data acquisition request at a time that is based on the update request time setting.

11. The program update system according to claim 1, wherein
each of the plurality of information processing apparatuses is an image forming apparatus.

12. An information processing apparatus comprising:
at least one controller configured to:
acquire job data including data to be processed in a second information processing apparatus;
manage and store the acquired job data in a job data management storage;
transmit the job data to the second information processing apparatus via a network, the job data being retrieved from the job data management storage in response to receiving a request from the second information processing apparatus;
acquire update data for updating a control program that controls an operation of the information processing apparatus;
store the acquired update data in an update data storage;
distribute the update data retrieved from the update data storage to the second information processing apparatus via the network;
determine a scheduled distribution time of the update data; and
store, in a setting storage, a delay set period to provide a period in which the update data is not transmitted after the job data is received, wherein
the delay set period is set based on a period from a time at which the job data is stored at the job data management storage to a time at which the second information processing apparatus starts a job regarding the job data, or to a time at which the job is completed, and
the at least one controller is further configured to:
determine the scheduled distribution time as the delay set period after a time at which a last one of the job data stored in the job data management storage is acquired, and
distribute the update data to the second information processing apparatus at the determined scheduled distribution time.

13. A method for updating a program of an information processing apparatus that updates a control program with which a predetermined function is implemented by update data,
the information processing apparatus including:
a primary machine that receives the update data transmitted from a distributor; and
one or more secondary machines, each of which updates the control program by using the update data transmitted from the primary machine, the control program implementing a function of an own information processing apparatus,
the method comprising:
causing a controller provided to the primary machine to:
determining a scheduled distribution time that is a scheduled time at which the update data is distributed to the one or more secondary machines,
store the scheduled distribution time of the update data,
acquire the update data used to update the control program,
acquire and store a job including data to be processed in the information processing apparatus,
set and store a job acquisition time that is a time at which the job is acquired,
storing a setting of a delay set period to provide a period in which the update data is not transmitted after the job is stored in the primary machine, and
distribute the acquired update data to the one or more secondary machines after the scheduled distribution time passes; and
thereafter causing a controller provided to the one or more secondary machines to:
receive the update data that is distributed from the primary machine, and
update the control program by using the received update data, wherein
in a case that one or more jobs, including the job, are acquired, the job acquisition time is set and stored for each of the one or more acquired jobs, and
in distributing the acquired update data, the controller provided to the primary machine is caused to determine the scheduled distribution time as the delay set period after a time at which a last job stored in the primary machine is acquired, and to distribute the update data to the one or more secondary machines at the determined scheduled distribution time.

14. The program update system according to claim 1, wherein
the at least one primary machine distributes the update data to the at least one secondary machine when a current time has passed the set scheduled distribution time after a reception of an update data acquisition request from the at least one secondary machine,
the at least one second controller is further configured to:
transmit the update data acquisition request to the at least one primary machine, and
set a scheduled update start time, the scheduled update start time being a time at which the second control program starts to update, and
in a case that the at least one secondary machine receives a retry response from the at least one primary machine, the at least one secondary machine postpones the scheduled update start time to transmit the update data acquisition request again, the retry response being a response to the update data acquisition request indicating that the update data is stored in the first update data storage but a time to distribute the update data has not come yet.

* * * * *